US012731189B2

(12) United States Patent
Drew et al.

(10) Patent No.: US 12,731,189 B2
(45) **Date of Patent: *Sep. 8, 2026**

(54) SOFTWARE SYSTEMS AND METHODS TO AUTOMATICALLY CORRELATE SUBJECT MATTER ITEMS AND PROVIDER DATA ACROSS MULTIPLE PLATFORMS

(71) Applicant: Diligence Fund Distributors Inc., Houston, TX (US)

(72) Inventors: Devon Drew, Houston, TX (US); Kevin D. Howard, Mesa, AZ (US)

(73) Assignee: Diligence Fund Distributors Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/205,688

(22) Filed: May 12, 2025

(65) Prior Publication Data

US 2025/0378498 A1 Dec. 11, 2025

Related U.S. Application Data

(63) Continuation of application No. 17/949,150, filed on Sep. 20, 2022, now Pat. No. 12,307,528.

(51) Int. Cl.
*G06Q 40/06* (2012.01)

(52) U.S. Cl.
CPC .................................... *G06Q 40/06* (2013.01)

(58) Field of Classification Search
USPC ............................................................ 705/36
See application file for complete search history.

(56) References Cited

U.S. PATENT DOCUMENTS

| | | | |
|---|---|---|---|
| 5,812,987 | A | 9/1998 | Luskin et al. |
| 6,857,004 | B1 | 2/2005 | Howard et al. |
| 7,133,950 | B2 | 11/2006 | Olukotun |
| 7,418,470 | B2 | 8/2008 | Howard et al. |
| 7,426,488 | B1 | 9/2008 | Gompers et al. |
| 7,730,121 | B2 | 6/2010 | Howard et al. |
| 7,941,479 | B2 | 5/2011 | Howard et al. |
| 7,958,194 | B2 | 6/2011 | Howard |

(Continued)

FOREIGN PATENT DOCUMENTS

| | | | |
|---|---|---|---|
| WO | WO 2001001219 | A2 | 1/2001 |
| WO | WO 2003050148 | A2 | 7/2003 |

(Continued)

*Primary Examiner* — Nigar Chowdhury
(74) *Attorney, Agent, or Firm* — Barnes & Thornburg LLP

(57) ABSTRACT

Computer systems and software methods configured to automatically correlate subject matter items and provider data across multiple platforms. These platforms can include newsfeeds, websites, social websites, apps and networks, internet and social network posts, online reviews, online queries, and the like. The system automatically generates a targeted list of relevant subject matter items, associated with entity-provided workflow steps, to be matched with enhanced preferences, and generating a list of options to be presented to the subject matter users or clients. Subject matter items can be listed in order based on third-party reviews, if any, and the best fit for client preferences, with or without associated providers. Subject matter item providers who interact with the system operator can ensure that their goods and services are included within the system.

20 Claims, 25 Drawing Sheets

Groups with Shared Profile and Preference Values

1) Changes in A change overlapped B, C, D items
2) Changes in B change overlapped A, C, D items
3) Changes in C change overlapped A, B, D items
4) Changes in D change overlapped A, B,C, D, E items
5) Changes in E change overlapped D items
6) Changes in F change only F

(56) References Cited

U.S. PATENT DOCUMENTS

| | | | |
|---|---|---|---|
| 8,108,512 | B2 | 1/2012 | Howard et al. |
| 8,325,761 | B2 | 12/2012 | Howard et al. |
| 8,386,356 | B2 | 2/2013 | Saccone |
| 8,499,025 | B2 | 7/2013 | Howard |
| 8,762,946 | B2 | 6/2014 | Howard |
| 8,843,879 | B2 | 9/2014 | Howard |
| 8,949,796 | B2 | 2/2015 | Howard |
| 8,959,494 | B2 | 2/2015 | Howard |
| 9,098,638 | B2 | 8/2015 | Howard |
| 9,146,709 | B2 | 9/2015 | Howard |
| 9,158,502 | B2 | 10/2015 | Howard |
| 9,170,909 | B2 | 10/2015 | Howard |
| 9,229,688 | B2 | 1/2016 | Howard |
| 9,280,320 | B2 | 3/2016 | Howard |
| 9,292,263 | B2 | 3/2016 | Howard |
| 9,324,126 | B2 | 4/2016 | Howard |
| 9,335,974 | B2 | 5/2016 | Howard |
| 9,395,954 | B2 | 7/2016 | Howard |
| 9,424,168 | B2 | 8/2016 | Howard |
| 9,626,329 | B2 | 4/2017 | Howard |
| 9,747,080 | B2 | 8/2017 | Howard |
| 9,851,949 | B2 | 12/2017 | Howard |
| 9,977,655 | B2 | 5/2018 | Howard |
| 10,009,168 | B2 | 6/2018 | Howard |
| 10,148,425 | B2 | 12/2018 | Howard |
| 10,216,692 | B2 | 2/2019 | Howard |
| 10,496,514 | B2 | 12/2019 | Howard |
| 10,943,299 | B2 | 3/2021 | Byun |
| 2005/0256793 | A1 | 11/2005 | Hamilton et al. |
| 2007/0100743 | A1 | 5/2007 | Barge et al. |
| 2007/0168270 | A1 | 7/2007 | De Diego Arozamena et al. |
| 2008/0228663 | A1 | 9/2008 | Smith |
| 2010/0251259 | A1 | 9/2010 | Howard |
| 2011/0029457 | A1 | 2/2011 | Axelrad et al. |
| 2012/0036399 | A1 | 2/2012 | Howard |
| 2012/0101929 | A1 | 4/2012 | Howard |
| 2013/0325750 | A1 | 12/2013 | Howard |
| 2013/0325860 | A1 | 12/2013 | Howard |
| 2013/0332903 | A1 | 12/2013 | Howard |
| 2014/0025430 | A1 | 1/2014 | Howard |
| 2014/0068464 | A1 | 3/2014 | Howard et al. |
| 2014/0198196 | A1 | 7/2014 | Howard et al. |
| 2014/0298286 | A1 | 10/2014 | Howard |
| 2014/0310678 | A1 | 10/2014 | Howard |
| 2014/0310680 | A1 | 10/2014 | Howard |
| 2015/0149535 | A1 | 5/2015 | Howard |
| 2016/0148264 | A1 | 5/2016 | Winstanley |
| 2016/0232241 | A1 | 8/2016 | Stoyanov |
| 2016/0241505 | A1 | 8/2016 | Hermsdorff |
| 2018/0068011 | A1* | 3/2018 | Hatami-Hanza ....... G06Q 10/10 |
| 2018/0068347 | A1* | 3/2018 | Fernandes ........... G06F 16/9574 |
| 2018/0101910 | A1 | 4/2018 | Smith et al. |
| 2018/0143946 | A1* | 5/2018 | Peng .................. G06Q 30/0277 |
| 2018/0300423 | A1* | 10/2018 | Dufour .............. G06Q 30/0251 |
| 2018/0350180 | A1* | 12/2018 | Onischuk ............... G07C 13/00 |
| 2019/0355190 | A1* | 11/2019 | Koo ........................ G06F 21/00 |
| 2019/0370308 | A1 | 12/2019 | Riggs et al. |
| 2020/0097951 | A1 | 3/2020 | Abramson et al. |
| 2020/0151682 | A1 | 5/2020 | Hurry et al. |
| 2020/0210162 | A1 | 7/2020 | Howard |
| 2021/0019158 | A1 | 1/2021 | Howard |
| 2021/0142143 | A1 | 5/2021 | Howard |
| 2021/0352160 | A1 | 11/2021 | Jackson |
| 2022/0076346 | A1 | 3/2022 | Smith et al. |
| 2022/0198779 | A1 | 6/2022 | Saraee |
| 2022/0207095 | A1 | 6/2022 | Giardalas |
| 2022/0245109 | A1 | 8/2022 | Hatami-Hanza |

FOREIGN PATENT DOCUMENTS

| | | | |
|---|---|---|---|
| WO | WO 2005111843 | A2 | 11/2005 |
| WO | WO 2012021523 | A2 | 2/2012 |
| WO | WO 2012024435 | A2 | 2/2012 |
| WO | WO 2013035824 | A2 | 3/2013 |
| WO | WO 2013184952 | A1 | 12/2013 |

* cited by examiner

Client Preferences
364
360
Workflow Subject Matter Items
362
Matcher
Recommendations
366
Workflow Step, Client Identity
304
Client
Client Identity
Work Step Options From Recommendation
Consultant
306
Selection

490

SOFTWARE SYSTEMS AND METHODS TO AUTOMATICALLY CORRELATE SUBJECT MATTER ITEMS AND PROVIDER DATA ACROSS MULTIPLE PLATFORMS

CROSS-REFERENCE TO RELATED APPLICATIONS

This application is a continuation of U.S. patent application Ser. No. 19/205,688, filed May 12, 2025, which is a continuation of U.S. patent application Ser. No. 17/949,150, filed Sep. 20, 2022, each of which is incorporated herein by reference in its entirety.

FIELD

This disclosure generally relates to software systems and methods and, more particularly, to software systems and methods to automatically correlate subject matter items and provider data across multiple platforms.

BACKGROUND

Since 1959, when IBM's Arthur Samuel pioneered machine learning (ML), it has been used to perform data matching. The concept of information extraction became widespread in 1987 by the US Navy's MUC-1 Naval operations message system, with significant support by the US Defense Advanced Research Projects Agency throughout the 1990s. The proliferation of the World Wide Web after its introduction in 1990 by Tim Berners turned the internet into a series of interlocked documents, making it accessible to computer-based information extraction. There have been many tools created to extract text-based information: naïve Bayes classifiers, support vector machines, multinomial logistic regression, recurrent neural networks, and maximum-entropy Markov models, to name a few. These conventional extraction techniques use a regression analysis and/or low-dimensional classification schemes. Although these models have had success with smaller datasets, they require supervised training of the dataset. The amount of data needed to train a system to represent accurate natural language processing is very large and, thus, the amount of training time required makes the effort very costly.

In 2018, Jacob Devlin created a new technique called the Bidirectional Encoder Representations from Transformers (BERT) model. BERT and its successors, Generative Pretrained Transformer (GPT, GPT2, and GPT3), Transformer XL (XLNet), Robustly Optimized BERT (RoBERTa), etc., use high-dimensional classification schemes like embedded transformers. Training for BERT and its successors is unsupervised and highly parallelizable, greatly reducing the training time. With training time no longer acting as the gating item, advanced linguistic techniques, like masked language models and next sentence prediction, can be used to increase the accuracy of extracted meaning and include such concepts as automatic keyword extraction, statement focus and meaning determination, and the writer's sentiment. The writer's sentiment can be given as strongly negative, negative, neutral, positive, and strongly positive for each keyword and statement derived from a given corpus of text.

Social media and search engines allow individuals to search for knowledge and interact globally with others, making it possible to perform online consulting, which from 2015 through 2020 generated $383 billion in value. In the modern world, with the vast amount of information available from multiple sources combined with the effect of influencers on popular opinion, it is very difficult for consultants to track the expanding data available across platforms as well as the frequently changing preferences of clients.

As such, improvements and innovations are needed for an online automated consultancy assistance system, using data scraping technology combined with modern natural language processing techniques.

SUMMARY OF THE INVENTION

The present invention provides embodiments configured to automatically correlate subject matter items and provider data across multiple platforms. These platforms can include newsfeeds, websites, social websites, apps and networks, internet and social network posts, online reviews, online queries, and the like.

In various embodiments, a Subject Matter Item Assistance System (SMIAS) and method co-joins providers of subject matter items with displayers of subject matter items, which can provide access to certain information, goods, or services that are within a subject matter area. Novice actors, such as subject matter item users, are able to describe their preferences to subject matter experts, such as subject matter item displayers, who use the SMIAS to automatically sift through the internet, or other network environments, to find out how reviewers feel about certain subject matter items while taking into consideration the novice user's preferences to help guide them to their desired goal. Similarly, providers of subject matter items can get very granular information not only of what the novice actors are selecting but, using the preferences, why they are selecting them. This is accomplished with their access to information provided by the SMIAS system operator. This system allows a subject matter displayer to determine a novice user's subject matter literacy, through tracking the webpage access, and how their preferences change over time.

In various embodiments, a SMIAS as a Consultancy Assistance System (CAS) and method co-joins providers of subject matter items with consultants as displayers of subject matter items, which can provide access to certain information, goods, or services that are within a subject matter area. Novice actors, such as clients, are able to describe their preferences to subject matter experts, such as consultants, who use the CAS to automatically sift through the internet to find out how reviewers feel about certain subject matter items while taking into consideration the client's preferences to help guide them to their desired goal. Similarly, providers of subject matter items can get very granular information. This is accomplished with their access to information provided by the CAS system operator. This system allows a consultant to determine a client's subject matter literacy, through tracking the webpage access, and how their preferences change over time.

Consulting services provide expertise and advice specific to a client's goals and preferences for consideration. The present invention presents systems and methods as tools for a consultancy organization and can benefit the consultant, the client, and subject matter item providers. The system of the present invention automatically generates a targeted list of relevant subject matter items, associated with consultant-provided workflow steps, to be matched with enhanced client preferences, thereby generating a list of options to be presented to the client. Subject matter items can be listed in order based on third-party reviews, if any, and the best fit for client preferences, with or without associated providers. All providers are analyzed for the value of their offered items and reputation, based on online third-party reviews. Subject matter item providers who interact with the system operator can ensure that their goods and services are included within the system.

Since the meaning, focus, and sentiment can be directly obtained from text data (and even image data), the present invention can automatically correlate specific subject matter items and provider data gleaned from webpages across multiple platforms with a client's preference data compiled from all relevant data accessed by that client. In an online consultancy setting, the client is appropriately presented with a list of acceptable items with associated providers within that subject matter, which can be sorted by relevancy, from which they can select an option. Unlike online searches which have no context and thus depend on the efficacy of a given set of queries, the present invention derives context from the workflow of the consultant, and subject matter results that are presented are associated with both the context and the current preferences of the client. Tracking selection preferences and their associated sentiment, by subject, per client over time is analogous to updating changes in client preferences over time.

Using platform-independent information and natural language processing to construct both client preferences and the most relevant best-fitting options of subject matter items with their associated providers can be complex. Client preferences can encompass not only the traditional goods and services (subject matter items) but also the perceived value of the items from third-party evaluators, any item-associated provider corporate and corporate leadership behavior identified in third-party reviews, and such diverse concepts as a place of origin for goods or services, past-present-future business ties, and the provider's service or philanthropic philosophy.

By using data gathering bots and modern natural language processing to automatically capture both client preferences and platform-independent subject matter items with associated providers, the present invention can better match relevant subject matter items found by online consulting services with the needs of their clients. The CAS of the present invention has three categories of users: system operators, consultants, and clients.

A system operator provides a set of keywords and seed URLs to the CAS on a per subject matter basis. Subject matter is defined herein as the area of expertise related to a class of consultants. For example, a furnishing consultant's subject matter might contain information on various kinds of furniture and home and office accessories with associated vendors and manufacturers. The CAS generates the subject matter items and their associated providers with semantic embedding to match those items to the preferences of the consultant's clients.

Consultants construct workflows to ensure that the options presented to clients are ones that can be offered by the consultant and all required work for a client is completed in the necessary order. A workflow consists of a number of workflow steps, each containing a list of subject matter keywords which are a subset of the keywords used by the system operator to locate subject matter items for the purpose of matching to client preferences. For example, for a financial consultant, workflow steps could include gathering information on investments, qualifying a client for a set of funds, determining investment types, and qualifying particular potential investments. Each consultancy has its own workflow, even those using the same subject matter. The workflow steps define the context needed for matching items to client preferences.

Clients go to consultants for expertise on a subject matter. They expect to be presented with choices that they find acceptable and help them achieve some set of goals. To define acceptable, the client usually creates a profile that is used by the system as the starting point for their preferences. The CAS generates the client preferences with semantic embedding so that subject matter items can be matched to the preferences of the consultant's clients in the context of the consultant's workflow steps. Changes in the subject matter area or in the client's preferences require different options to be presented; the present invention automatically and continuously tracks both.

The above and other aspects of the embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and enable a person skilled in the pertinent art to make and use the embodiments disclosed herein. In the drawings, like reference numbers indicate identical or functionally similar elements.

DETAILED DESCRIPTION OF PREFERRED EMBODIMENTS

Referring generally to FIGS. 1-25, the present invention comprises software systems and methods as tools for organizations or expert entities (e.g., subject matter item displayers) that can benefit the entity, subject matter item users, and subject matter item providers. The system of the present invention automatically generates a targeted list of relevant subject matter items, associated with entity-provided workflow steps, to be matched with enhanced preferences, generating a list of options to be presented to the subject matter users or client. Subject matter items can be listed in order based on third-party reviews, if any, and the best fit for client preferences, with or without associated providers. All providers are analyzed for the value of their offered items and reputation, based on online third-party reviews. Subject matter item providers who interact with the system operator can ensure that their goods and services are included within the system.

Figure 1:
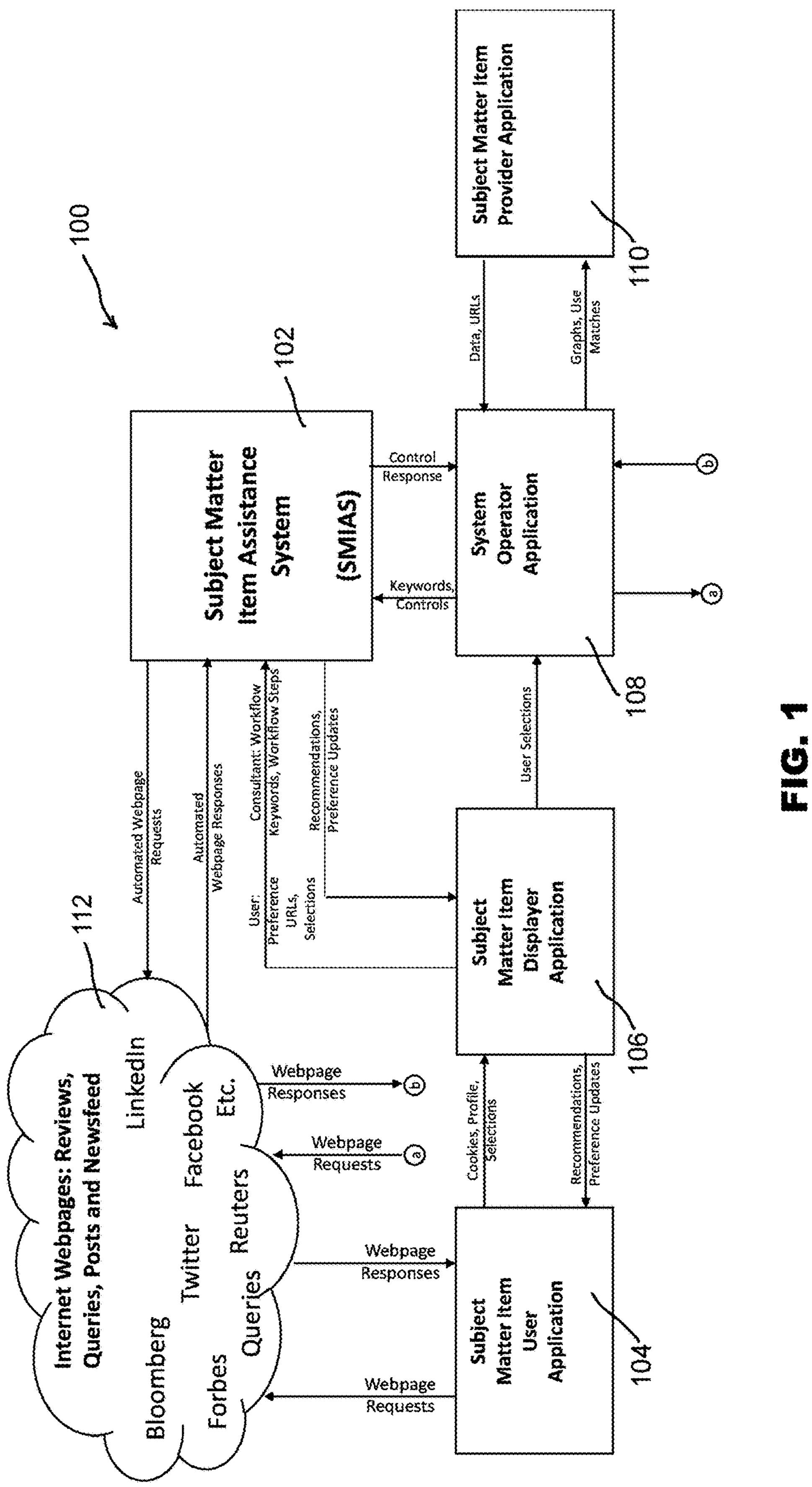
FIG. 1 shows a block diagram of a Subject Matter Item Assistance System (SMIAS) and method that co-joins providers of subject matter items with displayers of subject matter items, which can provide access to certain information, goods, or services that are within a subject matter area, in accordance with embodiments of the present invention.

FIG. 1 shows a diagram of a Subject Matter Item Assistance System (SMIAS) 100 and method that co-joins providers of subject matter items with displayers of subject matter items, which can provide access to certain information, goods, or services that are within a subject matter area. The system 100 can include a gathering, storage and processing SMIAS system 102, one or more subject matter item users 104, one or more subject matter displayers 106, and one or more system operators 108, all in operative processing communication. A subject matter item provider 110 is in operative communication with the system operator 108. The system 102 automatically correlates specific subject matter items and provider data from webpages across multiple platforms 112 (e.g., reviews, queries, posts, newsfeeds, etc.) with a user's 104 preference data compiled from all relevant data accessed by that user 104.

Novice actors, such as the subject matter item users 104, are able to describe or provide their preferences to the subject matter experts, such as subject matter item displayers 106, who use the SMIAS 102 to automatically sift through the internet, or other network environments, to find out how reviewers feel about certain subject matter items while taking into consideration user 104 preferences to help guide them to their desired goal. Similarly, providers 110 of subject matter items can get very granular information, not only of what the users 104 are selecting, but using the preferences of why they are selecting them. This is accomplished with access to information provided by the SMIAS system operator 108. This system 100 allows the subject matter displayer 106 to determine a novice user's 104 subject matter literacy, through tracking the webpage access, and how their preferences change over time.

Figure 2:
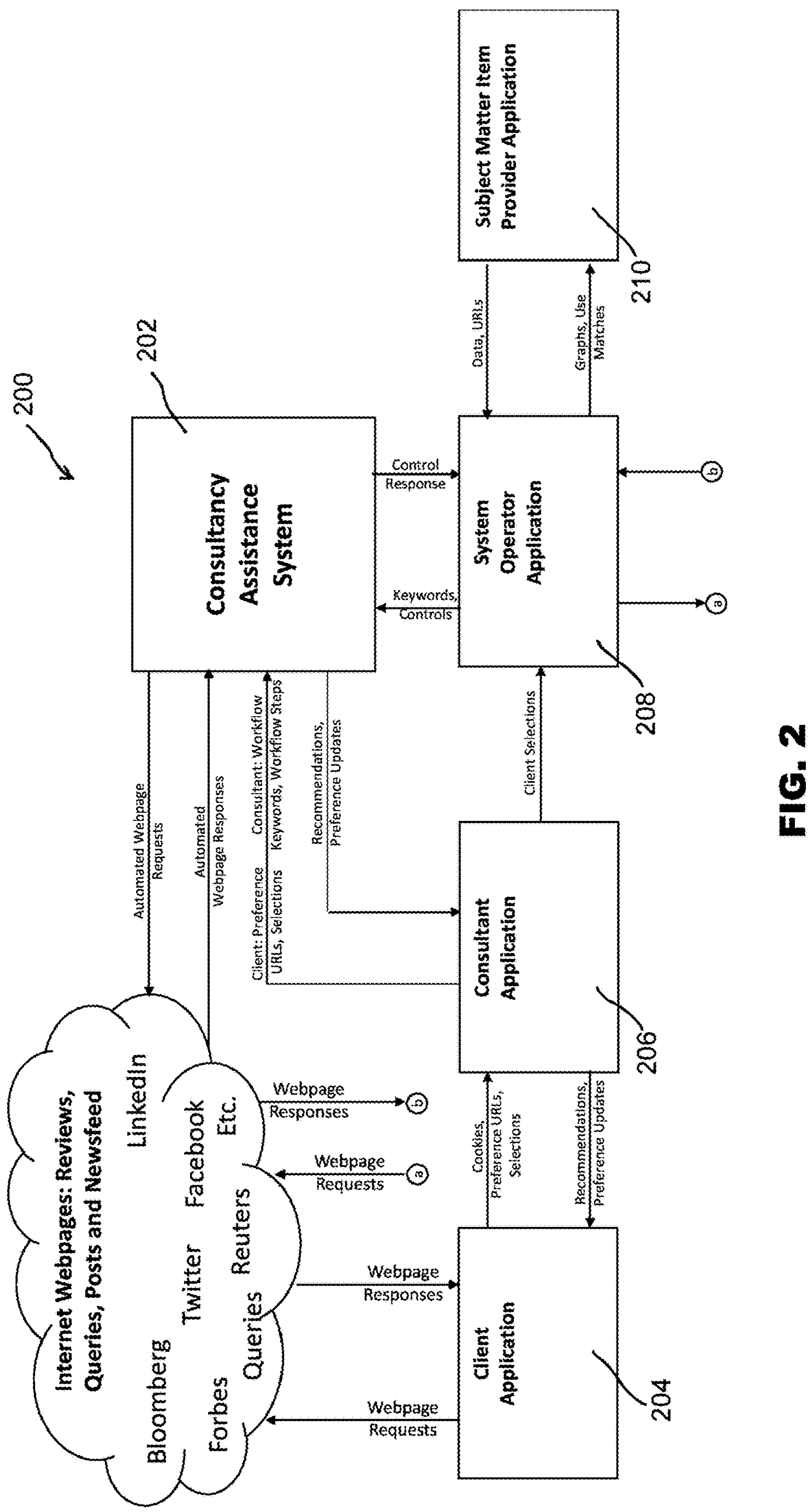
FIG. 2 shows a block diagram of a SMIAS as a Consultancy Assistance System (CAS) and method that co-joins providers of subject matter items with consultants as displayers of subject matter items, which can provide access to certain information, goods, or services that are within a subject matter area, in accordance with embodiments of the present invention.

FIG. 2 shows a diagram of a SMIAS as a Consultancy Assistance System (CAS) 200 and method that co-joins providers 210 of subject matter items with consultants as displayers of subject matter items, which can provide access to certain information, goods, or services that are within a subject matter area. The system 200 can include a gathering, storage and processing SMIAS system 202, one or more clients 204, one or more consultants 206, and one or more system operators 208, all in operative processing communication. Clients 204 are able to describe or provide their preferences to consultants 206 who use the SMIAS 202 to automatically sift through the internet, or other network environments, to find out how reviewers feel about certain subject matter items while taking into consideration client 204 preferences to help guide them to their desired goal. Similarly, providers of subject matter items 210 can get very granular information, not only of what the client actors 204 are selecting, but using the preferences of why they are selecting them. This is accomplished with their access to information provided by the SMIAS system operator 208. This system 200 allows the consultant 206 to determine a client 204 subject matter literacy, through tracking the webpage access, and how their preferences change over time.

The following list details various features, processing methods and steps, and system aspects in accordance with embodiments of the present invention.

Subject Matter Items

1) Subject matter items include online goods and services with text or image-based descriptions and ratings for use by online consultants.
2) The system employs a webpage text-extraction tool and natural language processing to automatically provide consultants access to and knowledge of subject matter items.
3) The system automatically tracks online reviews of subject matter items and incorporates the results of such reviews in a consultant's work and analysis.

Client Subject Matter Literacy and Preferences

1) The system tracks which webpage is accessed, when it is accessed, and for how long it is accessed to determine a client's subject matter literacy and literacy changes.
2) The system employs natural language processing to determine the sentiment of a client's tracked webpage text access to predict preferences.

Client Subject Matter Item Selections

1) The system automatically combines clients with similar preferences into various groups including geographic, self-selection, and influencer groups.
2) The system automatically determines which client in a group of similar client offers the fastest and best group subject matter item selection prediction (group leader determination).
3) The system uses client groups to determine subject matter item selection trends.

Consultant Subject Matter Provider Determination and Client Preference Utilization 1) The system employs automatic integration of subject matter providers into consultant offerings based on the consultant client's preferences.
2) The system employs automatic subject matter item presentations to clients based on the consultant workflow in combination with a client's preferences.
3) The system employs automatic subject matter item presentations to clients based on the consultant's plan for the client and the client's preferences.
4) The system employs automatic subject matter item presentation to clients based on the consultant's written advice in combination with a client's preferences.

Consultant Subject Matter Item Selection Prediction and Trends

1) The system applies natural language processing to extracted subject matter-related webpage text to automatically determine third-party reviewers.
2) The system automatically determines an influencer from the third-party reviews.
3) The system automatically determines an influencer's strength.
4) The system automatically combines geographic areas and self-selection group to determine more specific influencers and their strength.

System Operator Interaction with Subject Matter Area. Websites, Consultants, Subject Matter Items, and Subject Matter Item Providers 1) The system operator seed website page list (URLs) and keywords are used to find relevant webpages, from which text is extracted and natural language processing applied to find the subject matter items used within a subject matter area.
2) Links on the various website pages are automatically followed and their text is automatically analyzed to fully scope subject matter area.
3) Providers of the detected subject matter items are themselves automatically found and associated with the subject matter items, along with the subject matter item provider-specific data, like price and availability, discounts, etc.
4) Consultants for the subject matter area are found using the natural language processor analysis of the text-extracted subject matter area webpages.

Subject Matter Item Providers Give their Initial Information to the System Operator so that they can Receive Information from the System 1) The total consultant subject matter item presentations to their clients for subject matter items carried by a subject matter item provider are shown to the subject matter item provider.
2) The total consultant subject matter item selection by their clients for subject matter items carried by a subject matter item provider are shown to the subject matter item provider.
3) The characteristics of the subject matter items that are selected are shown.
4) The characteristics of the subject matter items can include characteristics the subject matter item provider provides.
5) The system can process and determine the ratio of subject matter items selected by clients and those same items presented from the subject matter provider to the clients.

Referring generally to FIGS. 3-11, a diagram of a SMIAS 300 configured to support online consultants. The Consultancy Assistance System (CAS) 302 is shown that automatically captures subject matter item and subject matter provider data across platforms 312 using system operator-provided 308 keywords and URLs using a bot 320 then annotates that data using semantic analysis 322. The system 300 can include a CAS 302, one or more clients 304, one or more consultants 306, one or more system operators 308, and one or more subject matter item providers 310, all in operative processing communication.

The system 300 automatically determines the preferences of consulting-service clients 304 for specific subject matter items by using semantic analysis 322 of the online platform-independent text read by each client 304 along with their initial profile. The system 300 automatically matches relevant internet-obtained, platform-independent, annotated subject matter data that has been selected by the consultant 306 via provided workflow steps with generated and managed client preferences. The system operator 308 can interact with subject matter item providers 310 for inclusion in the set of system-known subject matter items and providers. Client 304 and consultant 306 preference data, as well as data for providers 310 that interact with the system operator 308, are automatically updated. Selection trends for individual and grouped clients are automatically tracked for future projections.

Figure 3:
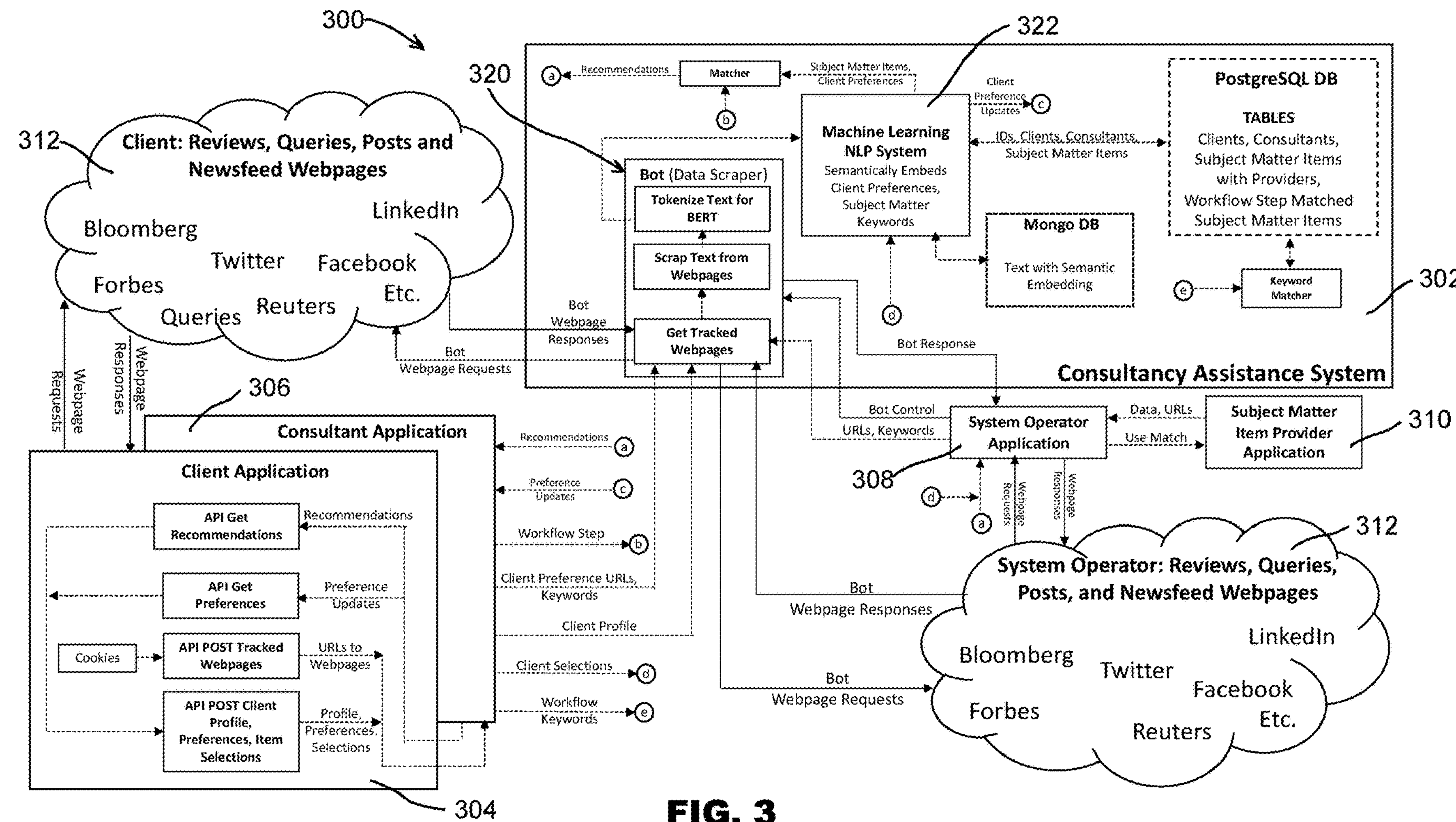
FIG. 3 shows a diagram showing an example of a CAS that enhances consultant, client, and subject matter item provider systems using natural language processing on internet webpage text to obtain subject matter items, reviews, sentiment, and preferences, in accordance with embodiments of the present invention.

The circled alphabetic references (e.g., a, b, c, d, . . . n) in FIG. 3 are line connectors, referencing data inputs and/or outputs within the figure.

The present invention comprises software systems and methods 300 as tools for consultancy organizations that can benefit the consultant 306, the client 304, and subject matter item providers 310. The CAS 302 of the present invention automatically generates a targeted list of relevant subject matter items, associated with consultant-provided workflow steps, to be matched with enhanced client preferences, generating a list of options to be presented to the client 304. Subject matter items can be listed in order based on third-party reviews, if any, and the best fit for client preferences, with or without associated providers 310. All providers 310 are analyzed for the value of their offered items and reputation, based on online third-party reviews. Subject matter item providers 310 who interact with the system operator 308 can ensure that their goods and services are included within the system.

Client preferences can encompass not only traditional goods and services (subject matter items) but also the perceived value of the items from third-party evaluators, any item-associated provider corporate and corporate leadership behavior identified in third-party reviews, and such diverse concepts as a place of origin for goods or services, past-present-future business ties, and the provider's service or philanthropic philosophy.

By using data-gathering bots or a bot engine 320 and modern natural language processing or an NPL engine 322 to automatically capture both client preferences and platform-independent subject matter items with associated providers 310, the present invention can better match relevant subject matter items found by online consulting services with the needs of their clients 304.

The system operator 308 provides a set of keywords and seed URLs to the CAS 302 on a per subject matter basis. Subject matter is defined herein as the area of expertise related to a class of consultants 306, identified as expert entities or subject matter item displayers in a SMIAS not configured to support consultants. For example, a furnishing consultant's subject matter might contain information on various kinds of furniture and home and office accessories with associated vendors and manufacturers. The CAS 302 generates the subject matter items and their associated providers 310 with semantic embedding 322 to match those items to the preferences of the consultant's clients 304.

Consultants 306 construct workflows to ensure that the options presented to clients 304 are ones that can be offered by the consultant 306 and all required work for a client 304 is completed in the necessary order. A workflow consists of a number of workflow steps, each containing a list of subject matter keywords which are a subset of the keywords used by the system operator 308 to locate subject matter items for the purpose of matching to client preferences. For example, for a financial consultant, workflow steps could include gathering information on investments, qualifying a client for a set of funds, determining investment types, and qualifying particular potential investments. Each consultancy has its own workflow, even those using the same subject matter. The workflow steps define the context needed for matching items to client preferences.

To define what is acceptable, the client 304 can create a profile that is used by the system 302 as the starting point for their preferences. The CAS 302 generates the client preferences with semantic embedding 322 so that subject matter items can be matched to the preferences of the consultant's clients 304 in the context of the consultant's workflow steps. Changes in the subject matter area or in the client's preferences require different options to be presented; the present invention automatically and continuously tracks both.

Figure 4:
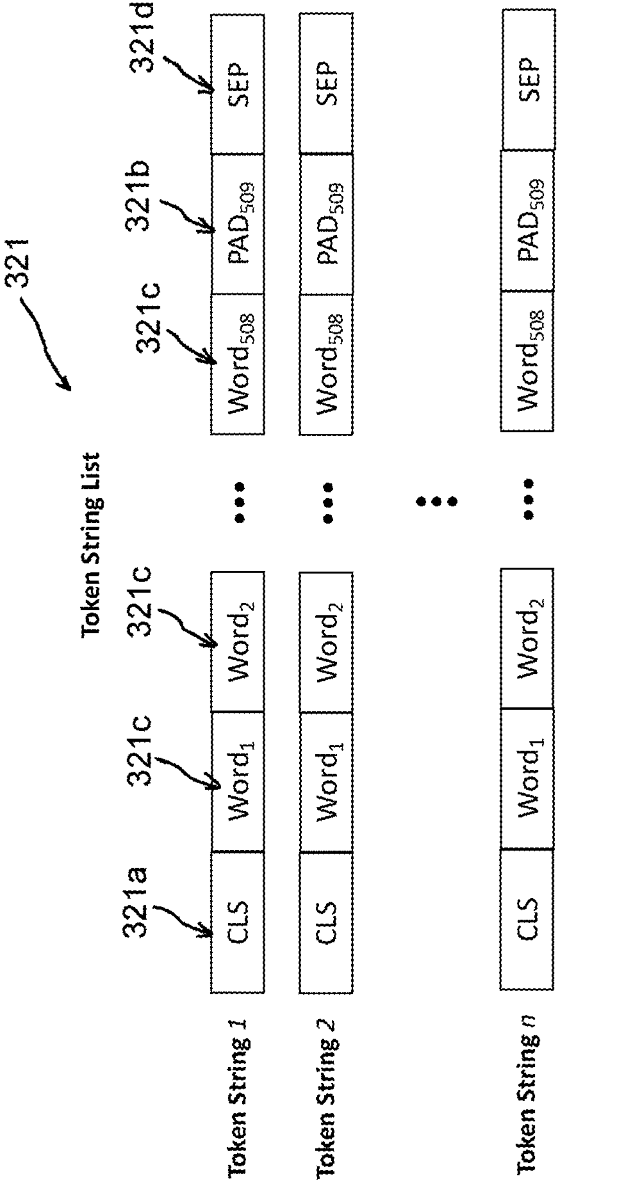
FIG. 4 shows a diagram of multiple token strings for the BERT natural language processor model, in accordance with embodiments of the present invention.

Referring to FIG. 4, the system operator 308 provides an initial set of keywords and URLs to a data-gathering bot 320, which searches webpages and all related links, including those from third-party reviewers and regardless of the platform generating the text, to build a set of subject matter items. The text from each found webpage is extracted, and tokens 321 are added and text formatted as required by a natural language processor (NLP) 322. Using the NLP subsystem 322, the text is analyzed, resulting in the extraction of focus, meaning, and sentiment about the keywords and key phrases. Subject matter items with associated providers and review data from third-party reviewers for both the items and the providers are then identified, using the focus, meaning and sentiment values, and is then saved.

Embodiments of the present invention can include a preferred method of natural language processing 322 using the Bidirectional Encoder Representations from Transformer (BERT) model. This model has already been trained against a large English language database and comes complete with masked language models (MLM) and next sentence prediction (NSP). All that is required is training for specialty words and phrases, after which the system 302 is ready to accept text for analysis. A "BertTokenizer" is the tool used by the data-gathering bot 320 when the BERT model is used. It takes text strings from webpages, texts, queries, posts, etc., and converts those text strings into a list of tokens 321. As shown in FIG. 4, there are only four types of tokens 321 required by the BERT model in certain embodiments: a category token (CLS) 321*a*, an unused token area designator (PAD) 321*b*, words 321*c*, and a sequencing token (SEP) 321*d*. Within the BERT model, the KeyBERT phrase extraction tool is used to extract key phrases and words from the token lists and attach to the keywords or key phrases information such as parts of speech, word or phrase position, phrase focus and keyword meaning, and sentiment values, such as negative, neutral, or positive.

Figure 5:
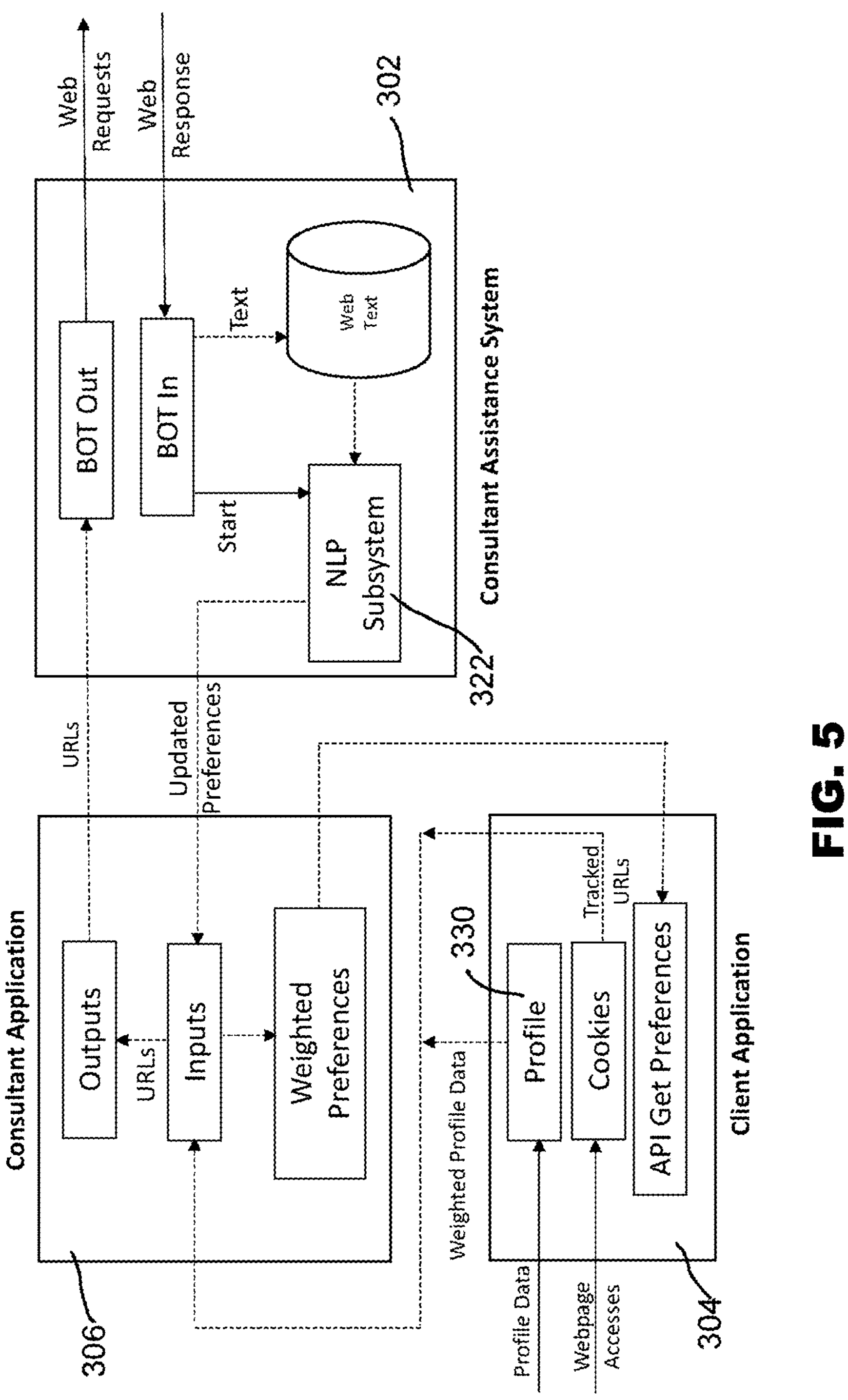
FIG. 5 shows a diagram of example communication between client applications, consultant applications, and the CAS, in accordance with embodiments of the present invention.

Referring to FIG. 5, the starting point for the client's preferences is an online profile 330 provided by the client 304. Each profile item that is relevant for determining a best match to subject matter items is initially weighted for significance by the client 304. The profile is converted into a set of URLs for use by the consultant application 306. In order for the present invention to automatically generate, update, and manage client preferences, the client 304 must grant tracking permission on their devices and/or accounts to track newsfeeds, social network posts, webpages, and the like, that are accessed by the client 304. The collected URL information is sent to the online CAS 302 where a bot 320 is used to capture the webpage information for each collected URL. The text from each webpage is extracted and then tokens 320 are added. The text with the tokens is then sent to the NLP subsystem 322 (BERT being a preferred model) where keywords and key phrases that are associated with a target subject are generated with attached meanings and sentiment. The keywords and their associated semantic interpretations are returned to the consultant and saved as the updated preferences for transmission back to the client.

FIG. 5 generally shows that client preferences are automatically updated based on any client-initiated profile changes, including how relevant items are weighted, and tracked webpage usage as well as option selections made from consultant-offered subject matter items.

Figure 6:
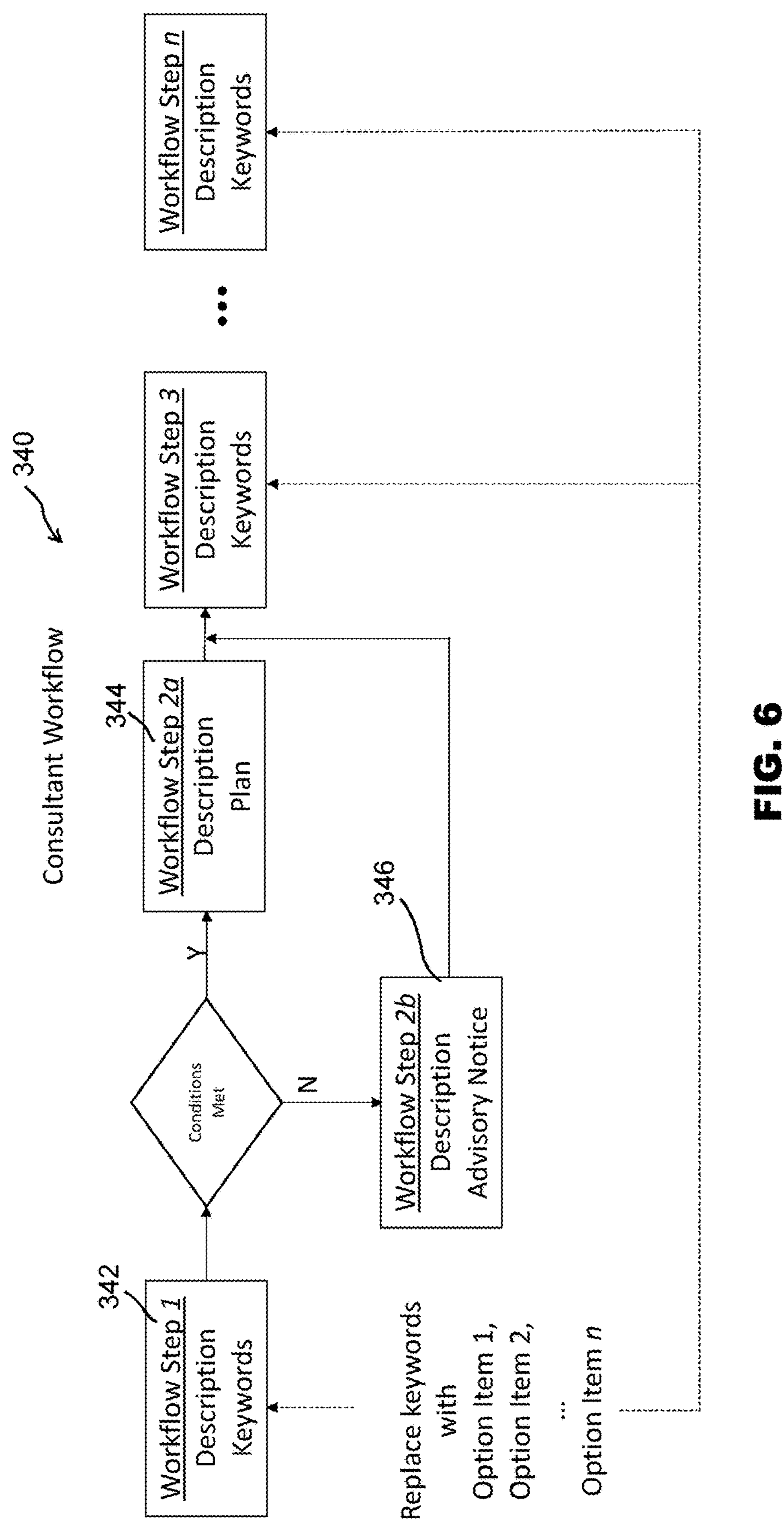
FIG. 6 shows a diagram of an example consultant workflow with multiple workflow steps, each containing options to be presented to the client, in accordance with embodiments of the present invention.

FIG. 6 shows a diagram of an example of a consultant-constructed workflow 340. A workflow can be constructed using drag-and-drop technology similar to that used by the popular no-code/low-code programming model. Example workflow steps can include: providing descriptions and keywords 342, providing descriptions and plans 344, and/or providing descriptions and advisor notices 346. A browser-based work area is accessed by the consultant 306, who adds the workflow steps, each of which contains a description of the activity required by the step and a list of keywords to be used by the system to find keyword matches previously used to find all subject matter items that have been saved. Matched subject matter items are then stored with the appropriate workflow step and called option items. The system 302 uses the client preferences to rate the options. Only the highest-rated options are presented to the client 304 for selection.

Figure 7:
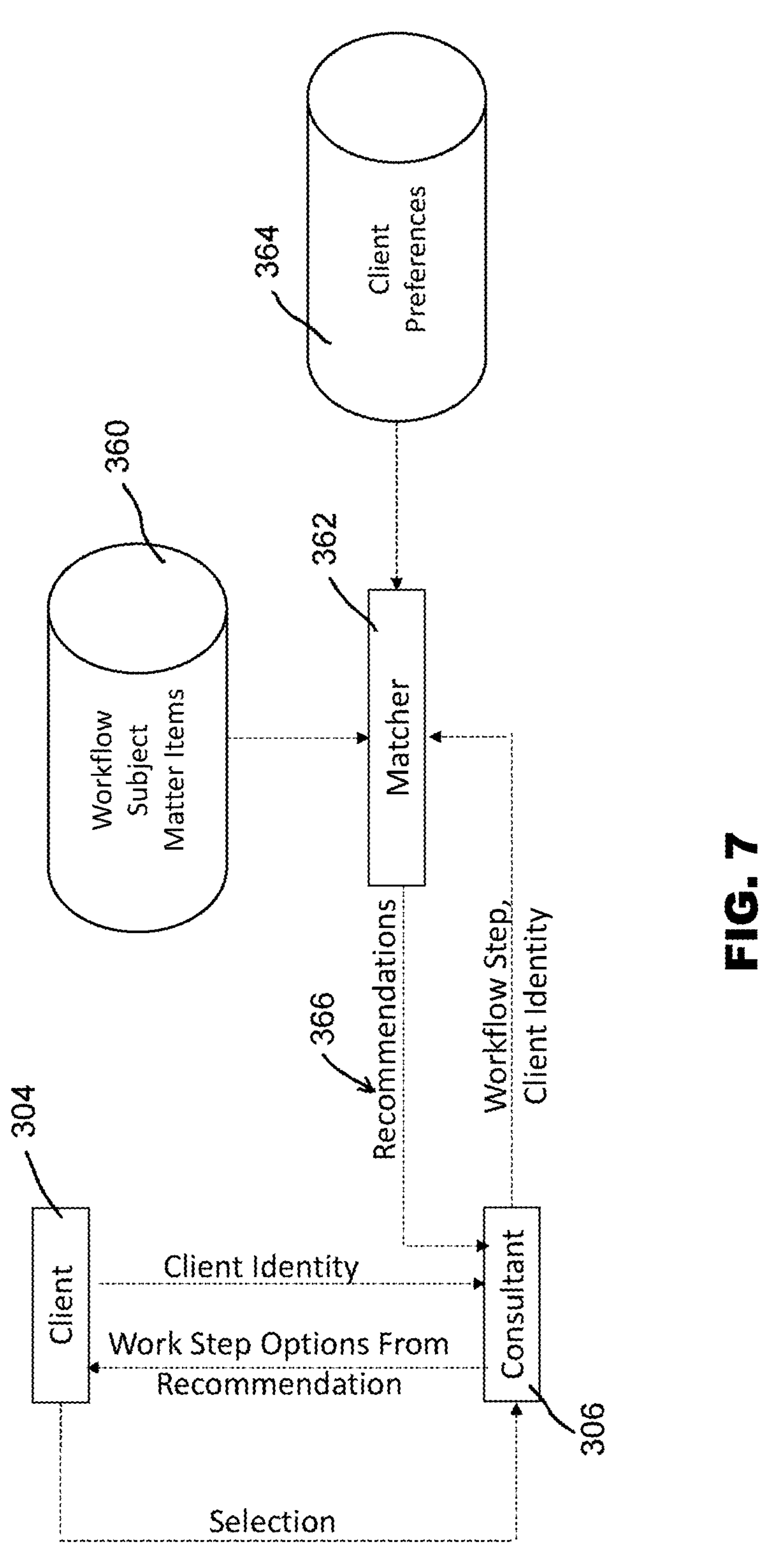
FIG. 7 shows a diagram of a simplified model for multi-platform-based goods or services selection for presentation to a client, in accordance with embodiments of the present invention.

FIG. 7 shows the subject matter items and their associated provider information that have been matched to keywords for the current workflow step and stored 360. These subject matter items that have been matched to workflow step keywords are compared and matched via a matcher 362 to the client's profile and current preferences 364. The resulting most relevant, best-matched subject matter items are then presented as recommendations 366 to the consultant 306 who presents them to the client 304. A recommended item is selected by the client 304 then used by the consultant 306 to make progress on achieving the client goals.

Figure 8:
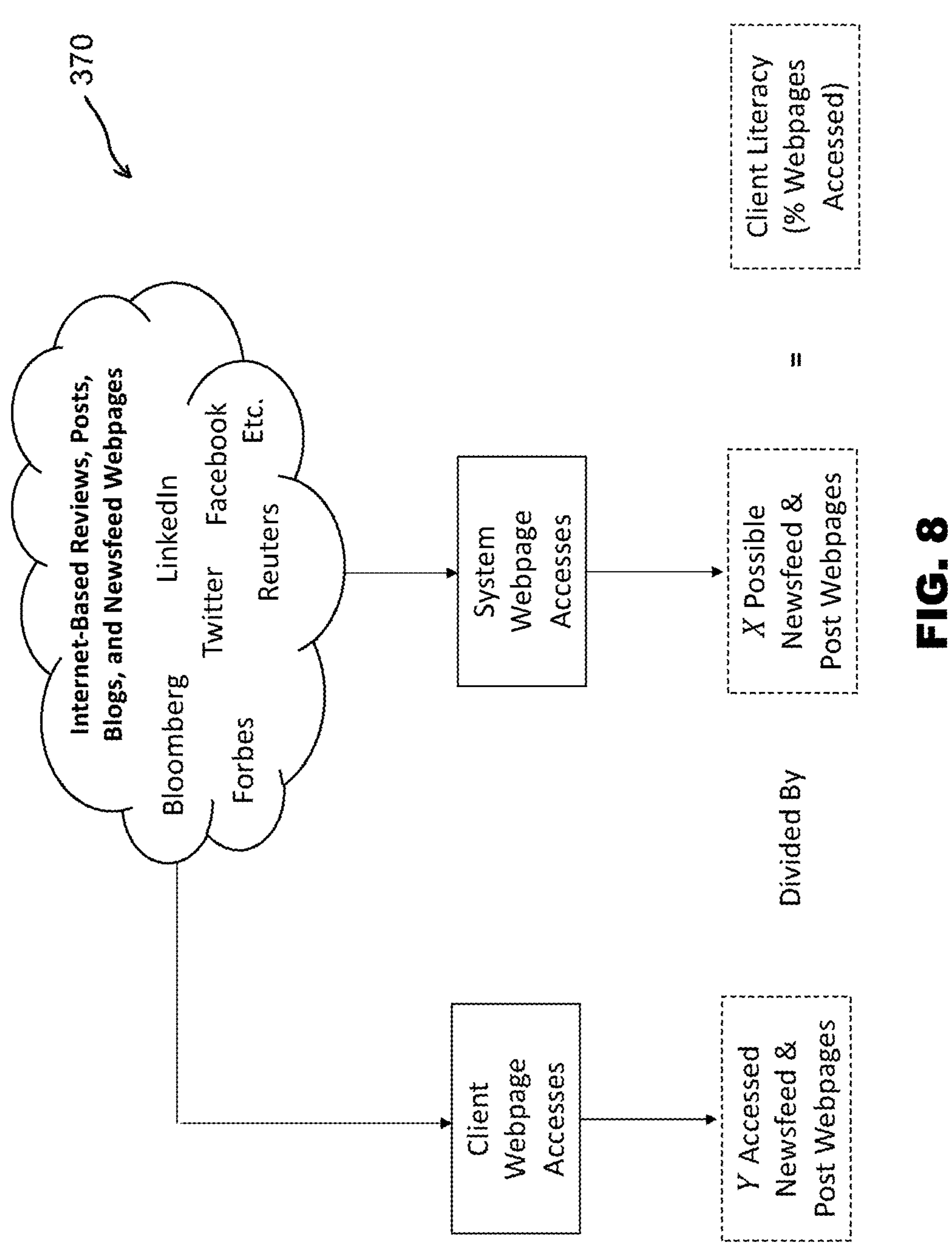
FIG. 8 shows a diagram of the information flow required to calculate client literacy, in accordance with embodiments of the present invention.
Figure 9:
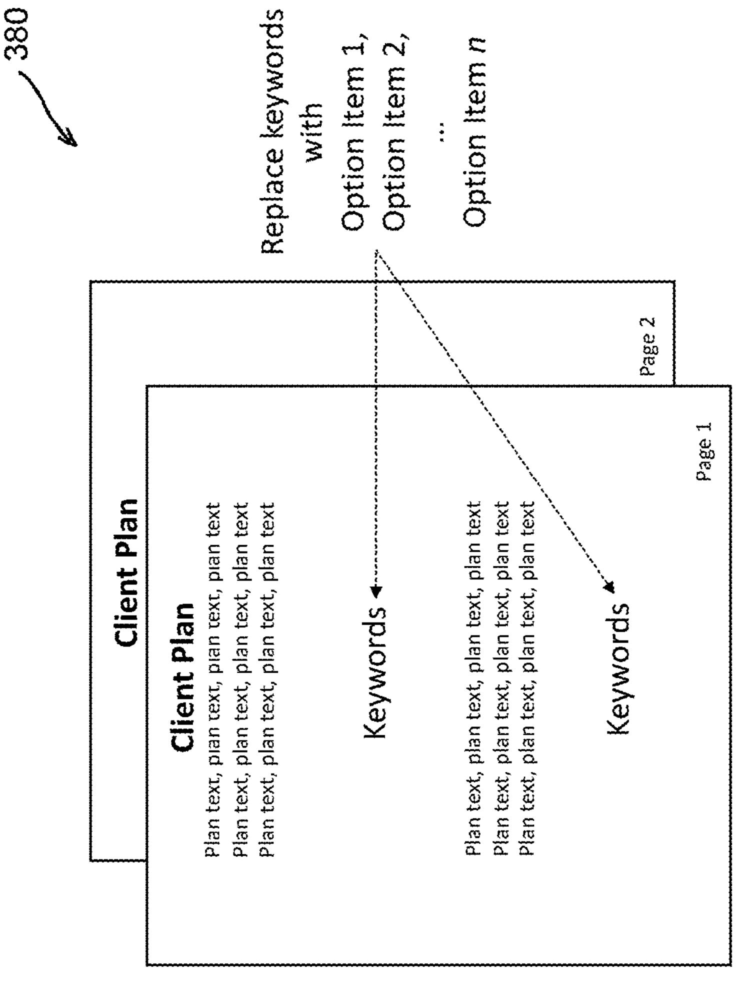
FIG. 9 shows an example of a plan from a consultant to a client with option items at each plan step provided by the CAS to the consultant, in accordance with embodiments of the present invention.
Figure 10:
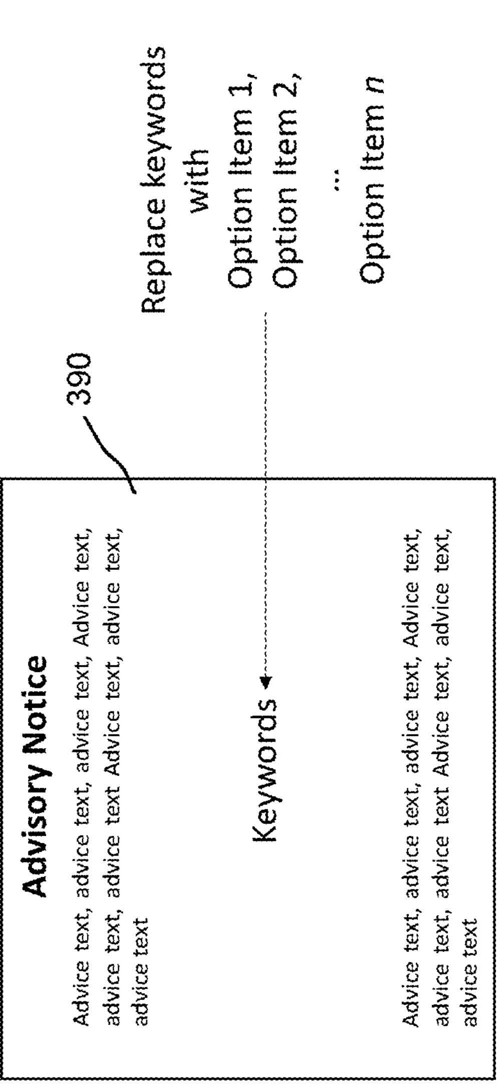
FIG. 10 shows an example of a consultant's written advice to a client with associated CAS-provided options, in accordance with embodiments of the present invention.

Referring generally to FIGS. 8-10, there are several general categories of online consultants 306, including coaches, planners, and advisors. The CAS 302 offers support in each of the categories.

Referring to FIG. 8, coaches 306 typically have no specific credentials so they offer advice on mindset and basic literacy on particular topics. In the system 302 process of automatically tracking a client's preferences (mindset), the system 302 also automatically tracks the breadth and scope of knowledge (literacy) of the clients 304, allowing the coach to establish a baseline and track both mindset and literacy changes over time. FIG. 8 shows the system feature 370 defining literacy as the number of subject matter webpages accessed by the client 304 out of the number of subject matter webpages known by the system.

Literacy Percentage $$L = Y/X \qquad \text{Equation 1}$$

Where Y=number of client-accessed subject matter area webpages

X=number of system-known subject matter webpages

Referring to FIG. 9, planners 306 are typically certified and work with the client 304 to create an action plan for an area of interest at the planning feature 380 of the workflow. The creation of a plan for a client 304 is similar to the creation of a workflow. Like the workflow, a plan has a number of steps, each with subject matter item options available to the client 304 for selection. As shown in FIG. 6, a plan is part of the planner's workflow, and there can be a plan at each workflow step. Unlike the workflow, the finished plan, after an option item has been selected per step, is the product for the client. FIG. 9 shows that the CAS 302 supports the planner by automatically generating a targeted list of relevant subject matter items (recommendations) with associated providers to be matched with enhanced client preferences, generating a list of options for each plan step.

Referring to FIG. 10, advisors 306 are typically registered, especially legal, financial, or medical advisors, and offer purchase or item use advice in the form of an advisory notice 390. The creation of an advisory notice in the advisory notice feature 390 of the workflow for a client 304 is similar to the creation of a workflow. Like the workflow, a notice has a number of steps, each with subject matter item options available to the client for selection. As shown in FIG. 6, an advisory notice, like a plan, is part of the advisor's workflow, and there can be a notice at each workflow step. Unlike the workflow, the finished advisory notice, after an option item has been selected per step, is the product for the client 304. FIG. 10 shows that the CAS 302 supports the advisor 306 by automatically generating a targeted list of relevant subject matter items (recommendations) with associated providers to be matched with enhanced client preferences, generating a list of options for each advisory notice step.

Figure 11:
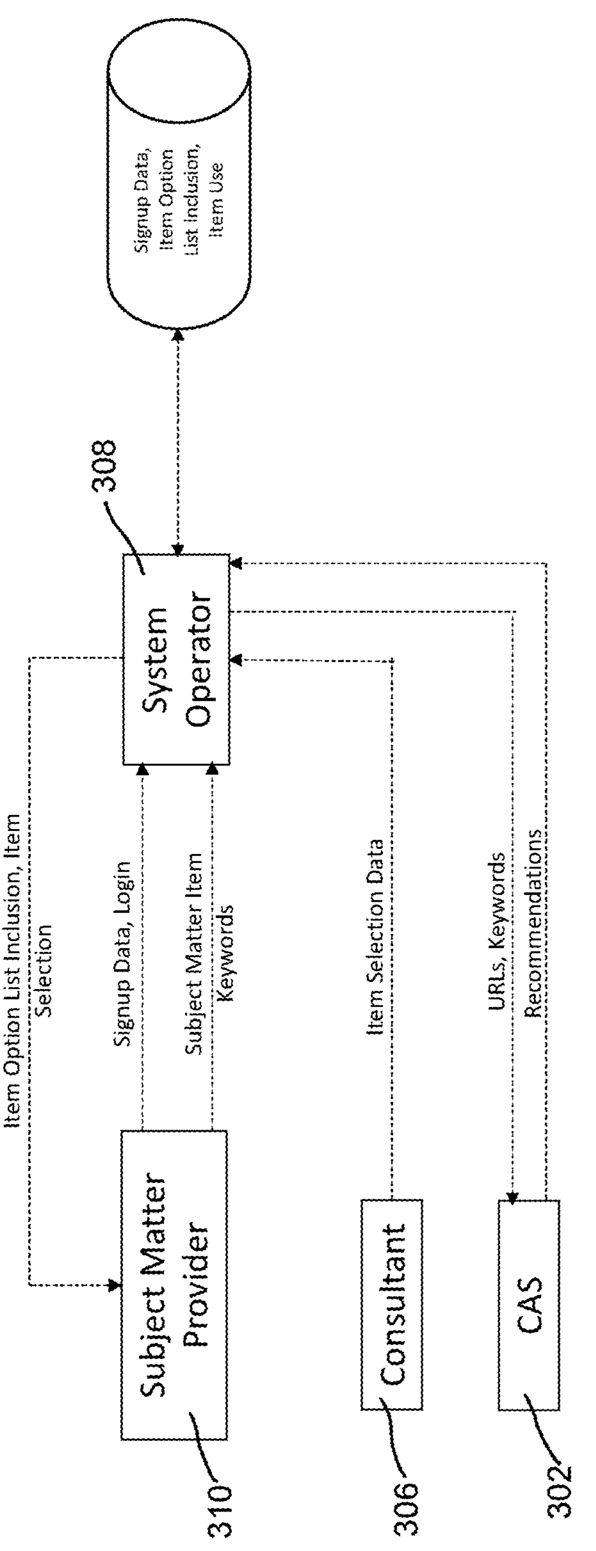
FIG. 11 shows a simplified system operator and subject matter item provider interaction, in accordance with embodiments of the present invention.

FIG. 11 shows that subject matter item providers 310 can sign up for inclusion in the CAS 302 by providing information concerning their organization, the subject matter items (goods and services) they provide, and the URL of relevant webpages, including for reviews of both the organization and/or any provided subject matter item to the system operator 308. The system operator 308 includes this provider info in the keywords and list of URLs that are transmitted to the CAS bot. If there are one or more matches of the provider's subject matter items to the preferences of consulting organizations via their workflows, the provider 310 is accepted by the system operator 308. Information concerning the inclusion of the provider's subject matter items in a list of options to be presented to the client 304 of a consultant 306 and any selection by that client of a subject matter item of the provider is transmitted to the provider by the system operator

308. The system 302 periodically scrapes new information from the internet concerning the provider 310 and their offered subject matter items to automatically update their information. The system operator 308 periodically requests from the CAS 302 a new internet search to find new subject matter item providers 310 who can be invited to sign up.

Referring generally to FIGS. 12-23, grouping clients together provides the system 300 with increased information extraction capability. There are two ways to group clients according to various embodiments of the present invention: preference grouping and influencer grouping.

Figure 12:
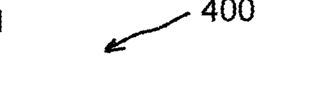
FIG. 12 shows a diagram of multiple ways for preference groups to interact, in accordance with embodiments of the present invention.

Referring to the grouping feature 400 of FIG. 12, it is possible for a system to automatically assign clients 304 to different preference groups since simple preference matching can be enough to determine group membership. Changing preferences or weighting affects a client's group membership. The more stable a group's membership is, the more representative the group is for an individual member. To determine group stability, each member's profile and preference rate of change is calculated and saved. Any client whose profile and/or preference rate of change is greater than some given epsilon (where epsilon is the maximum acceptable rate of change) is kept out of all groups until their profile and preferences are stable. Grouping clients with the same preferences and essentially the same weighting factors for the same targeted subject matter has several advantages, including processing speed, leadership identification, and group trends. FIG. 12 shows that groups can overlap other groups, allowing for a client's simultaneous membership in multiple groups.

Figure 13:
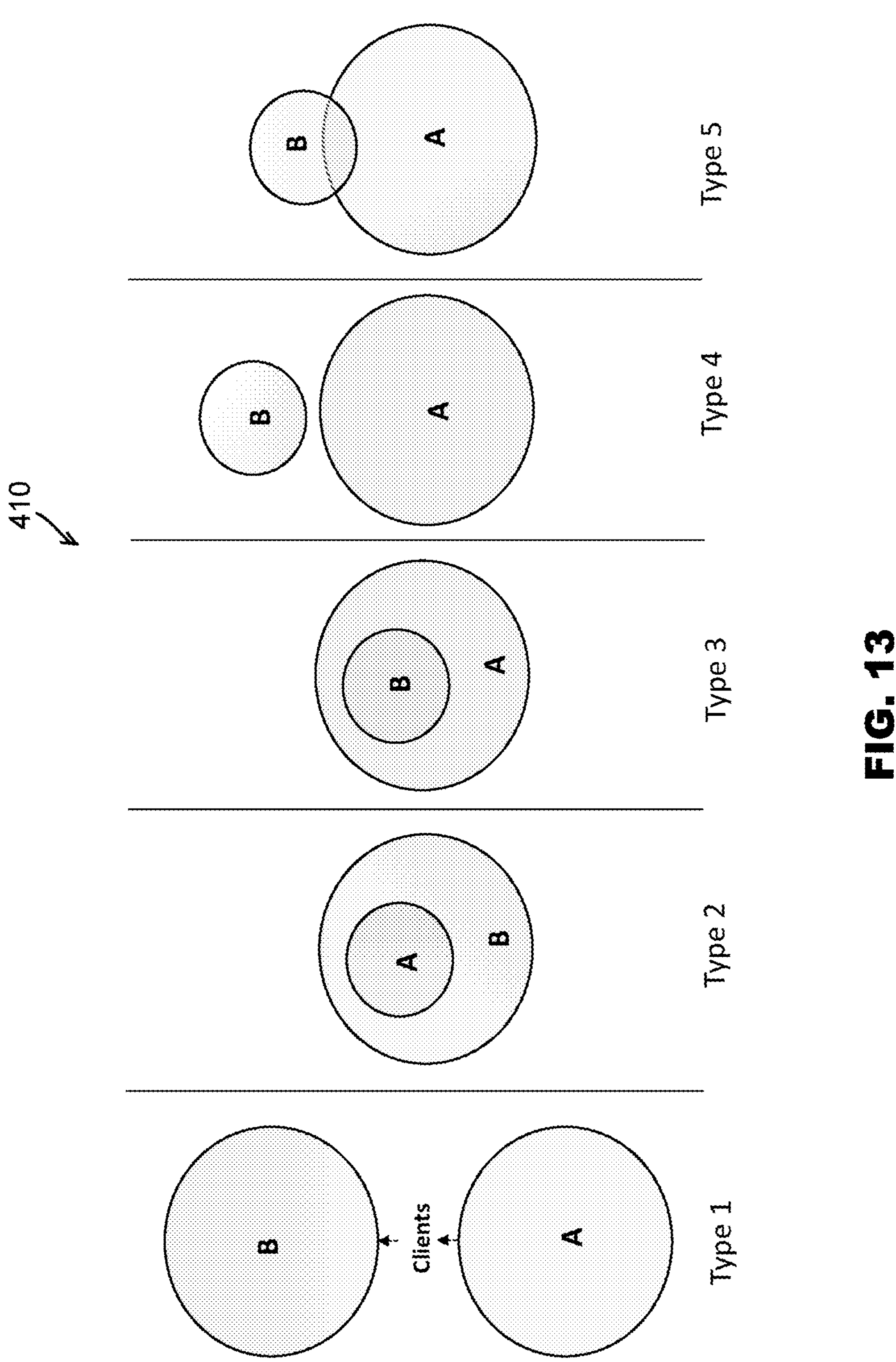
FIG. 13 shows a diagram of various ways for client preferences to change their group or create new groups, in accordance with embodiments of the present invention.

If a member of a group changes their profile and/or preferences such that they no longer fit their existing group, then group membership changes occur, and new groups can be created at least in one of the five ways 410 shown in FIG. 13.

Type 1: if the client's changed preferences match an existing preference group that is different than its original preference group, then the client is moved to the matching preference group. The first panel shows a type 1 client moving from preference group A to group B.

Type 2: if the client keeps all of the original group preferences and adds new preference information that does not match any other existing group, then a new group is automatically created that contains the original group but is extended. The second panel shows a type 2 client moving from group A to newly formed extended group B, which subsumes group A.

Type 3: if the client's new preferences contain a subset of the original preference groups preferences and does not match another preference group, then a new preference group is formed within the original group, and the client is moved to the new group. The third panel shows a newly formed group B that is subsumed by group A.

Type 4: if the client's new preferences do not match any of the original group's preferences and does not match any other preference group, then a new preference group is created and the client is moved to the new group. The fourth panel shows a newly formed preference group B outside of all other existing preference groups.

Type 5: if the client's new preferences partially match the original group's preferences but no longer fully match, then a new group is formed that overlaps the original group and the client is moved to the new overlapping group. The fifth panel shows a newly formed preference group B overlapping the existing group A.

Figure 14:
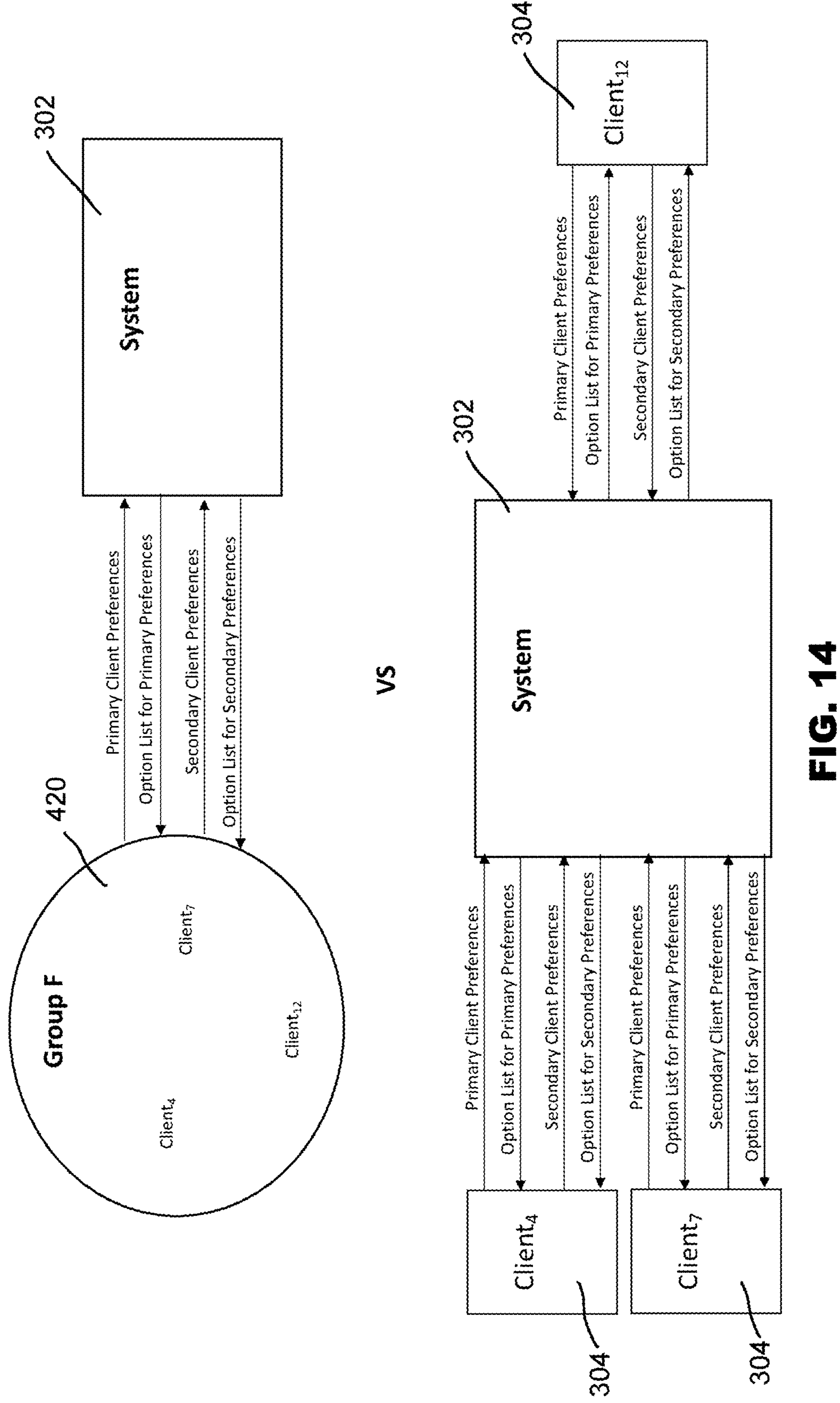
FIG. 14 shows the difference in the number of system accesses required for a group versus for a set of individual clients, in accordance with embodiments of the present invention.

Referring to FIG. 14, determining the proper item option list from the subject matter items with associated providers, given a client's preferences, can require significant processing. FIG. 14 shows that eliminating duplicate processing decreases both the overall processing time and the amount of processing equipment required. Since all clients within an identified preference group 420 have, by definition, the same preferences, item list generation only has to be done once per group.

Figure 15:
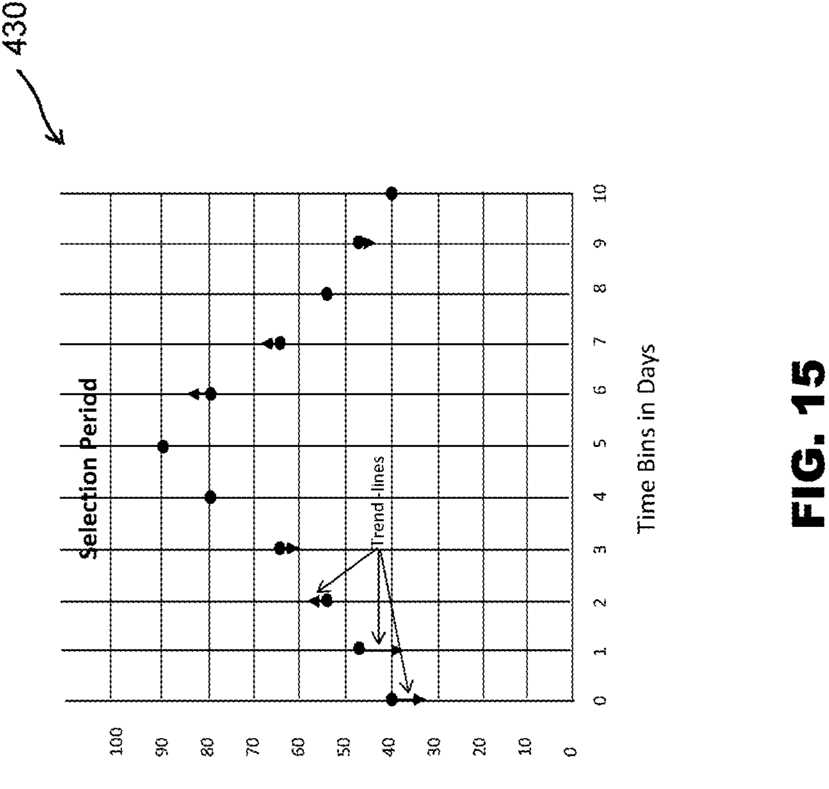
FIG. 15 shows a graph of the number of group members selecting the same subject matter item as the group leader per time bin after the group leader's selection, in accordance with embodiments of the present invention.

Referring to graph 430 of FIG. 15, there are group members who are consistently faster to select an item from the list of options generated by the system 302 than the average member. It is assumed that even though multiple selection opportunities may occur, only one selection is made per selection opportunity. Although different group members will select different items, some members will more consistently select a listed item most selected by the group. Members who are faster than average to make a selection and are better than average at selecting an item most selected by other group members are identified by the system 302 as potential group leaders. The system 302 identifies one leader who consistently selects at the fastest rate and has the highest percentage of selections that correlate with the selection by the highest number of group members.

The probability of a group member selecting an item that has also been selected by the group leader is determined by the system 302. The average time from the group leader's selection of an item from a set of options and the final selection of an item by a group member from the same set options is calculated and split into the number of time bins given by the system operator 308. The probability of a group member selecting the same item as a group leader within a particular time bin is calculated. This allows the system 302 to estimate the number of members who are likely to select the same item as the leader at each time bin. Graphing the expected number of members selecting the same item as the group leader per time bin allows the system to predict for any new selection.

FIG. 15 shows that since changes in the actual number of group members who select the same item as the leader within each time bin are tracked over time by the system 302, a selection trend per time bin can be determined, allowing the present invention to better predict the future item selection patterns of the group.

Referring to Table 1 below, because there can be overlap between multiple groups, there can be overlap between some or all group members. An indicator is assigned to the account of each group leader for each simultaneous group that leader represents. The number of groups, the number of members in each group, and the number of members per group who make the same selection as the leader, gives the predictive strength of the group leader.

TABLE 1

| Group and Group Leader | | | | | | | | |
|---|---|---|---|---|---|---|---|---|
| Group Number | Group Leader Id | Conditional Probability of a Member Selecting Leader's Selection | Group Leader Indicator | Time Bin 1 (Days) | Bin 2 (Days) | Bin 3 (Days) | . . . | Bin N (Days) |
| 001 | 1001 | 25% | 3 | 75 members | 220 members | 300 members | . . . | . . . |
| 002 | 1002 | 32% | 1 | 12 members | 15 members | 16 members | . . . | . . . |
| . . . | . . . | . . . | . . . | . . . | . . . | . . . | . . . | . . . |
| X | 1001 + x | 12% | 1 | 23 members | 33 members | 34 members | . . . | . . . |

Figure 16:
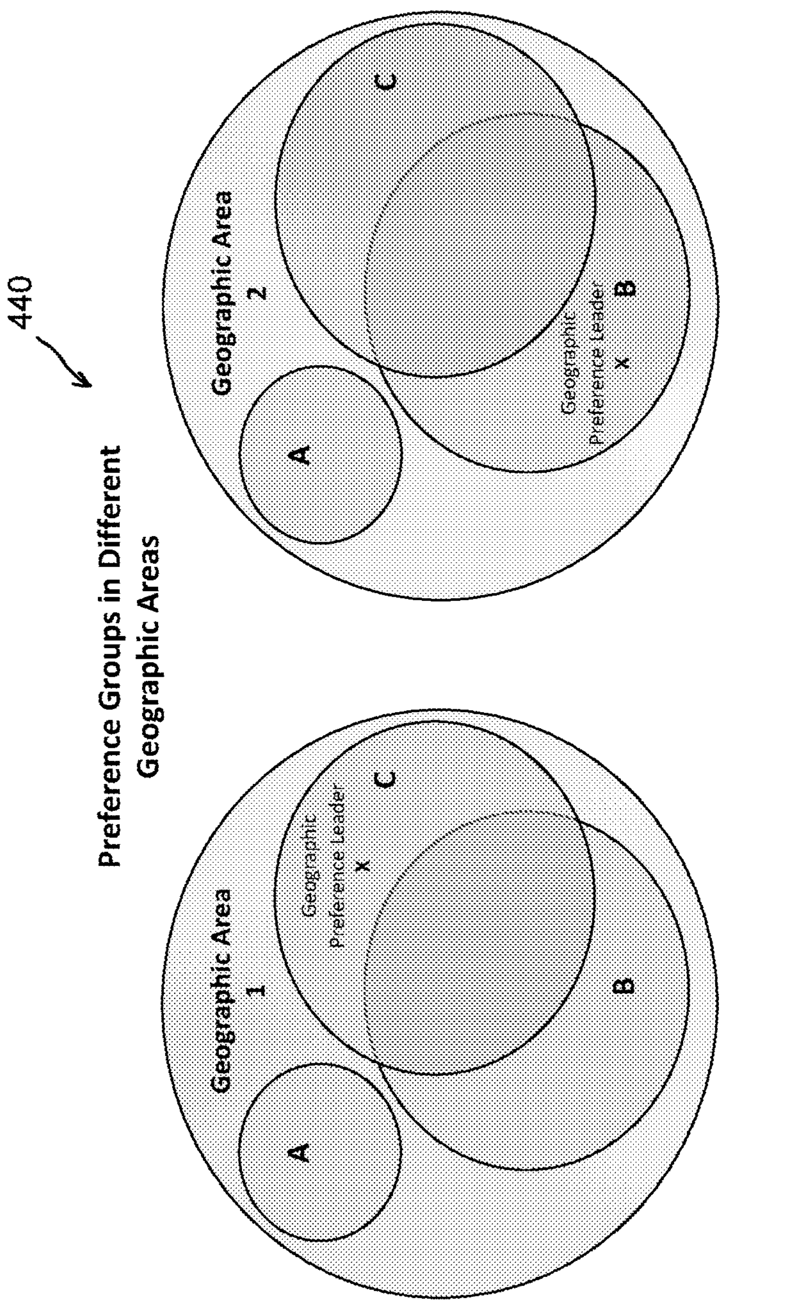
FIG. 16 shows a diagram of the effects of geographic area on the preference leader selection, in accordance with embodiments of the present invention.

FIG. 16 shows that preference groups 440 can be geographically bound and that grouping by both geographic area and preference group means it is possible to identify different preference group leaders by geography, which may generate new leaders or geographic preference leaders.

Figure 17:
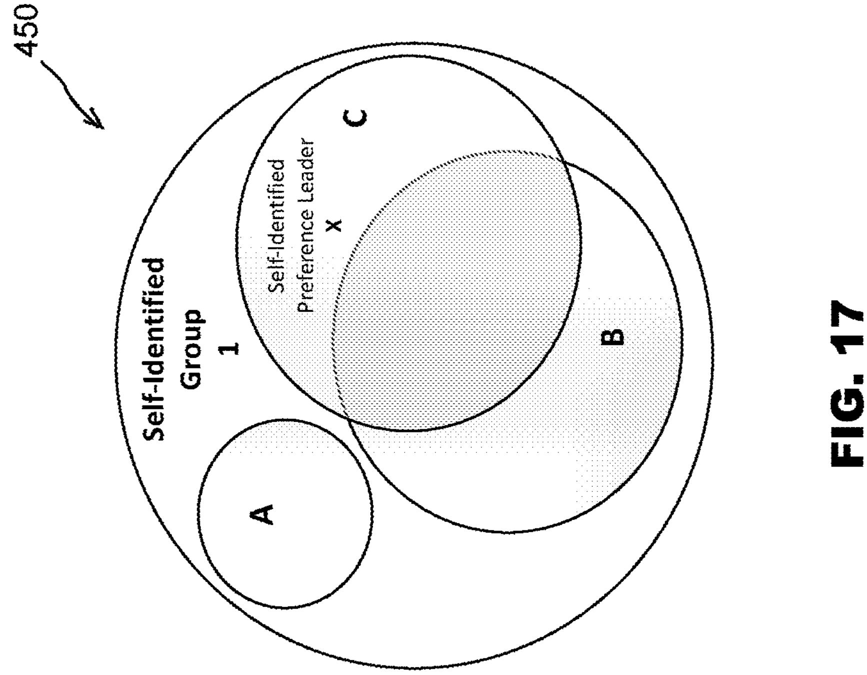
FIG. 17 shows a graph of the effect of self-identification on preference leader selection, in accordance with embodiments of the present invention.

FIG. 17 shows that preference groups 450 can also be bound within self-identification groups such as gender, ethnicity, workplace, religious affiliation, etc. Grouping by self-identification and preferences means that it is possible to identify different preference group leaders by self-identification, which may generate new leaders or self-identification preference leaders.

Figure 18:
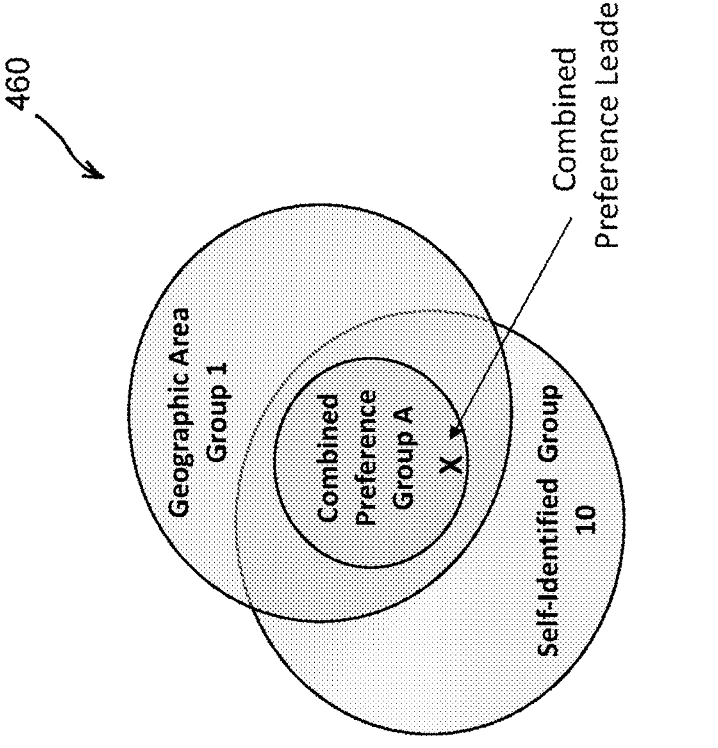
FIG. 18 shows a graph of the combined effect of geographic area and self-identification on preference leader selection, in accordance with embodiments of the present invention.

FIG. 18 shows an example 460 that combines preference, geographic preference, and self-identification preference groups. Those clients who are in all three groups are considered to be in a combined group, which may generate new leaders, combined group preference leaders.

Figure 19:
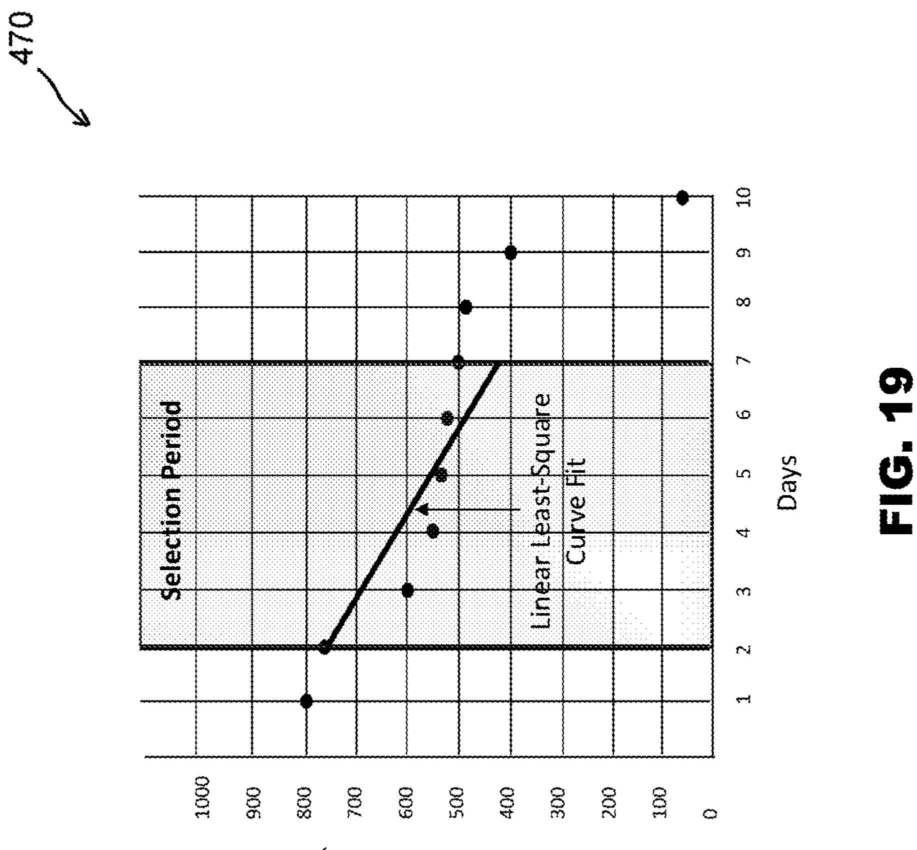
FIG. 19 shows a graph of a subject matter item selection trend line over a defined period, in accordance with embodiments of the present invention.

Referring to the global trend line graph 470 of FIG. 19, trends can be determined from the selections by preference groups, whether alone or as part of a geographic or self-identified group. Subject matter items can be associated with multiple providers and on the option list of multiple consultants. A subject matter item with its associated provider can be selected by multiple preference groups. The selection trend of subject matter items can be separated from the selection trend of their associated providers and both can be graphed using the linear least-square curve fit (or a similar model) based on the item selection over some time period. If selections across all preference groups of a subject matter item or a subject matter item provider are used, then the resultant graph is called a global trend line graph. If only the selections of a particular preference group are used then the resultant graph is called a preference group trend graph.

Figure 20:
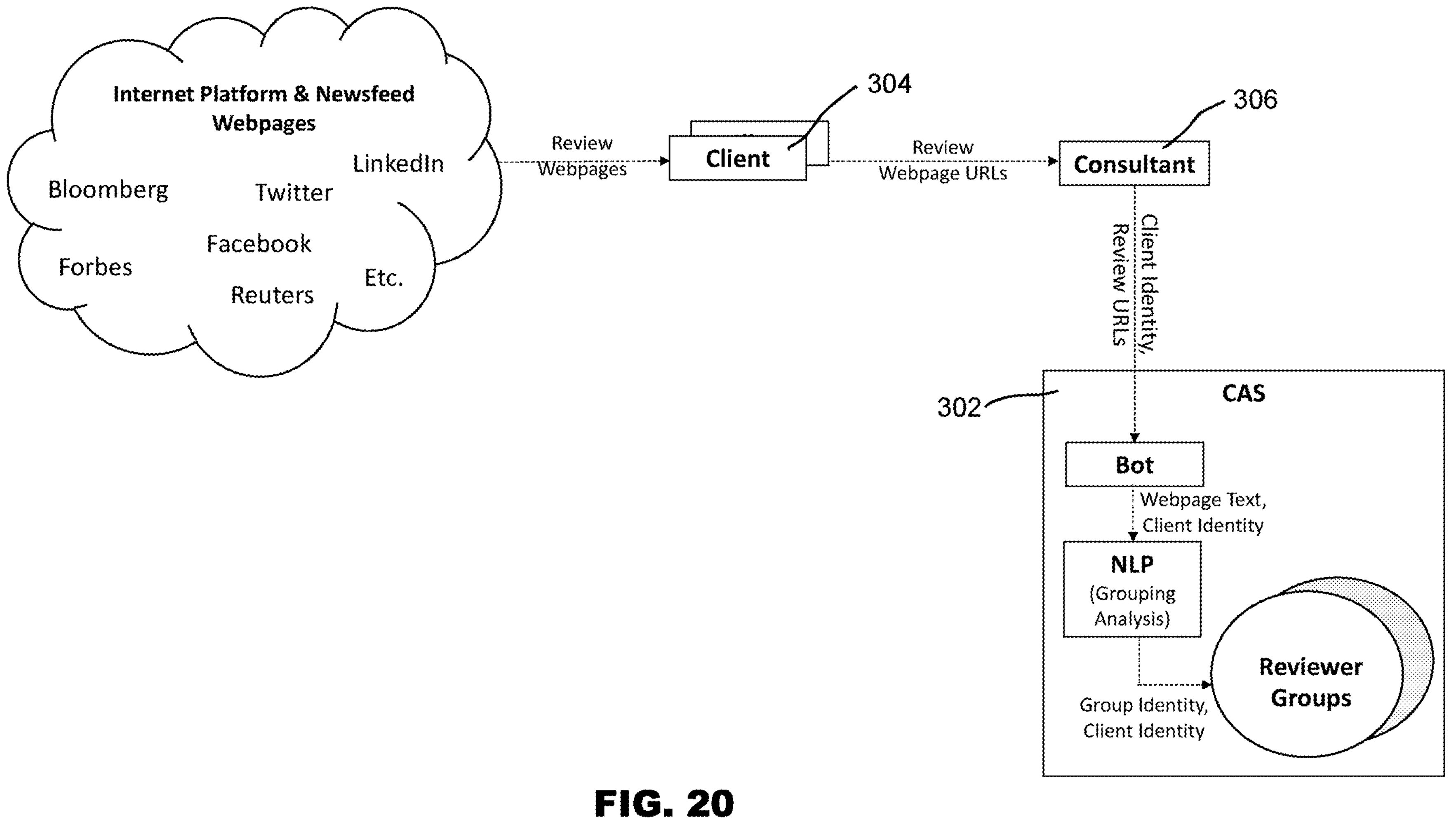
FIG. 20 shows a diagram of client selection by a reviewer group, in accordance with embodiments of the present invention.

FIG. 20 shows a diagram of the CAS 302 combining clients 304 into reviewer groups. During the automatic client preference generation process, reviewers of both subject matter items and their associated providers are identified with associated sentiment. A client 304 who examines the text of a reviewer is said to be part of a group called the reviewer group.

Figure 21:
FIG. 21 shows a graph of the relative influence strength of various influencers, m accordance with embodiments of the present invention.
Figure 21:
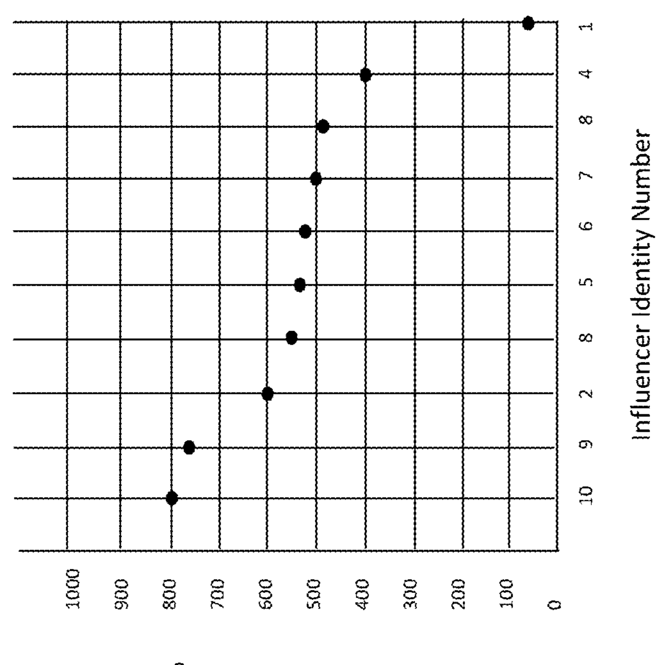

Referring to the influencer strength graph 480 of FIG. 21, a client can belong to multiple reviewer groups. The reviewer (within the set of reviewers accessed by the client) who has the strongest influence over a client will be considered that client's influencer. That is, the client is added to that reviewer's influence group. A reviewer that influences at least one client is considered an influencer. Unlike other definitions of internet influencers, this one does not depend solely on the number of people they attract but also on their impact on what is selected by clients. The strength of an influence is calculated as the number of clients under influence times the conditional probability of the clients changing their selection behavior based on the influencer. FIG. 21 is an exemplary graph of influencer strength, allowing for influencer comparisons.

Influencer Strength $$I = P(CIR)n \qquad \text{Equation 2}$$

Figure 22:
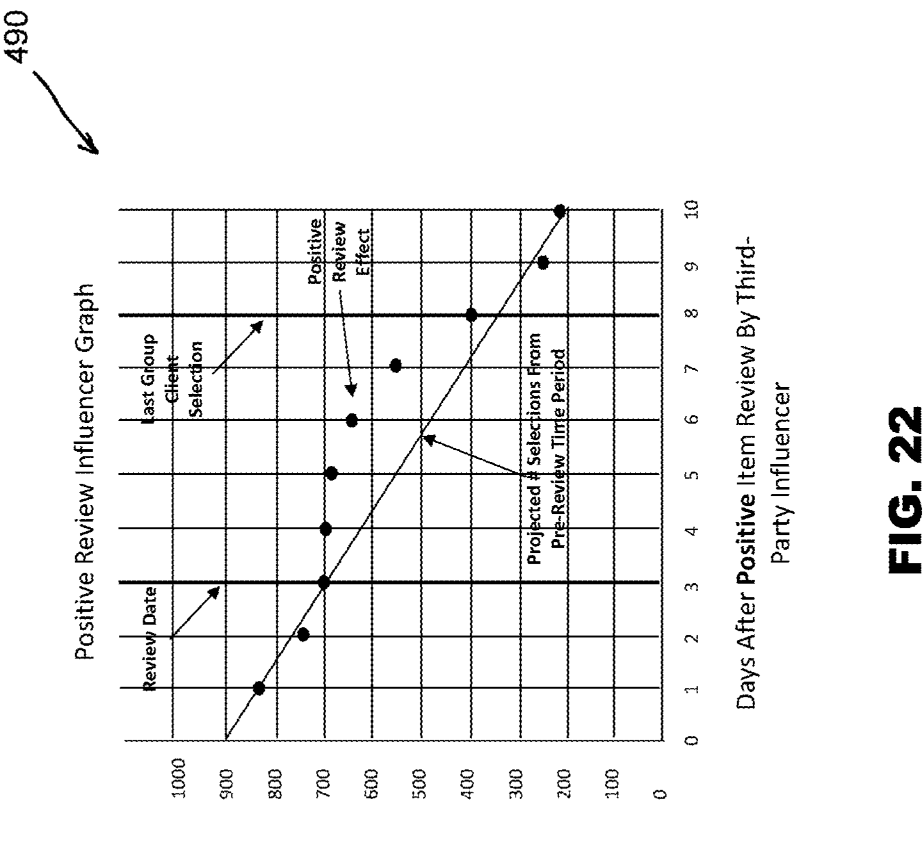
FIG. 22 shows a graph depicting positive influence effects, in accordance with embodiments of the present invention.

Where: P(CIR)=probability of client subject matter item selection change given review n=the number of clients within an influencer group Referring to the influence effect graph 490 of FIG. 22, both positive and negative influence is possible. Comparing the number of selections of a subject matter item before and after a review shows the effect and duration of the effect of an influencer. FIG. 22 shows the graphed influence effect on subject matter item selection from a positive review.

Figure 23:
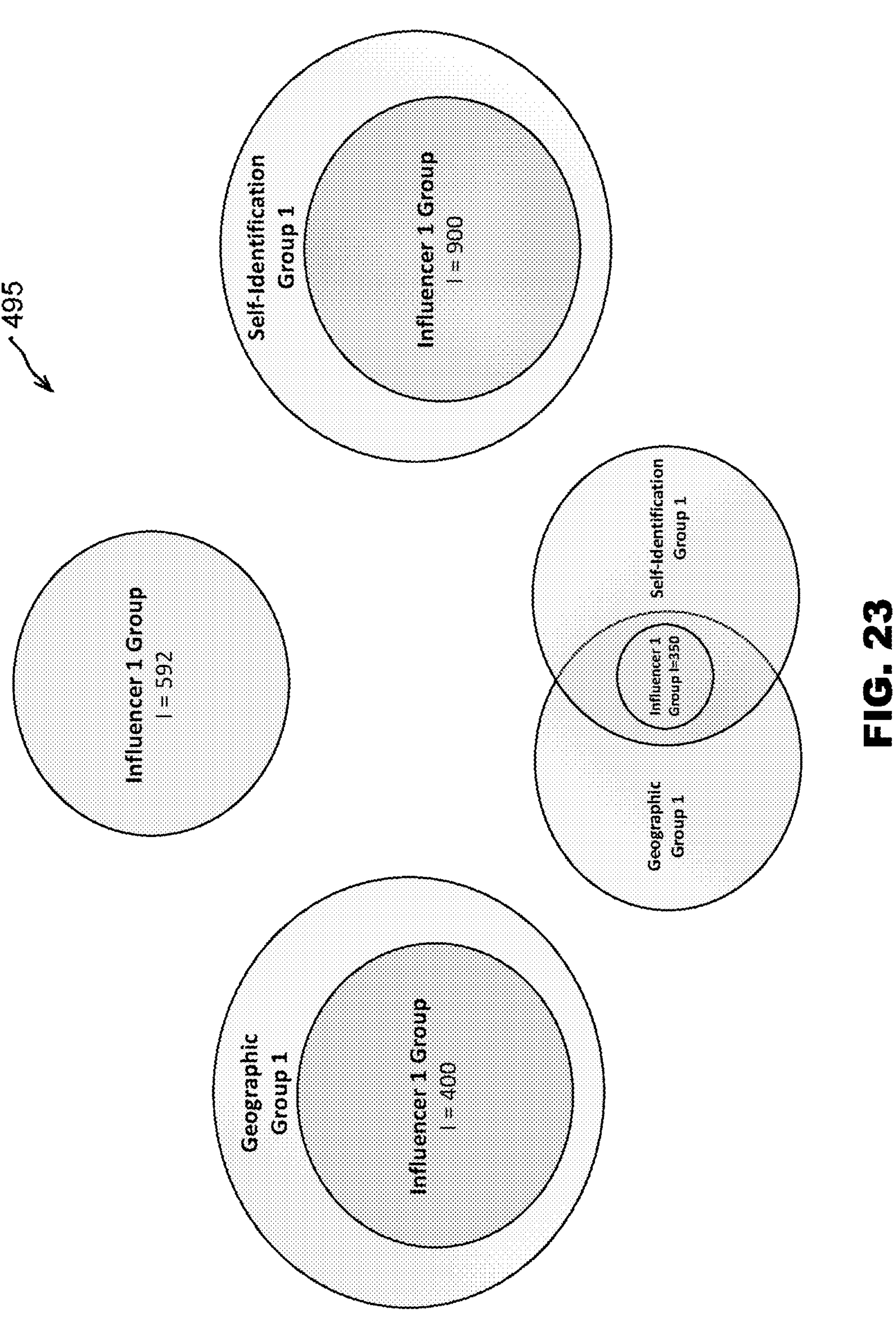
FIG. 23 shows a diagram of the effects of geographic area, self-identified, and combined geographic area and self-identification groups on influence group creation, in accordance with embodiments of the present invention.

The influencer group illustration 495 of FIG. 23 shows that an influencer group can be bounded by geography, self-identification, both or neither, and the strength of the influencer can vary with geography, self-identification, both or neither. This leads to a table of influencers and the effects of positive and negative reviews, as demonstrated below in

TABLE 2

Influencer Effects

| Group Leader Id | Conditional Probability of a Member Selecting After Positive Review | Conditional Probability of a Member Not Selecting After Negative Review | Prereview Selection Rate of Changes | 1 (Days) | 2 (Days) | 3 (Days) | . . . | N (Days) |
|---|---|---|---|---|---|---|---|---|
| 1001 | 25% | 35% | −10 | 75 members | 220 members | 300 members | . . . | . . . |
| 1002 | 32% | 28% | −12 | 12 members | 15 members | 16 members | . . . | . . . |
| . . . | . . . | . . . | . . . | . . . | . . . | . . . | . . . | . . . |
| 1001 + x | 12% | 17% | −28% | 23 members | 33 members | 34 members | . . . | . . . |

Figure 24:
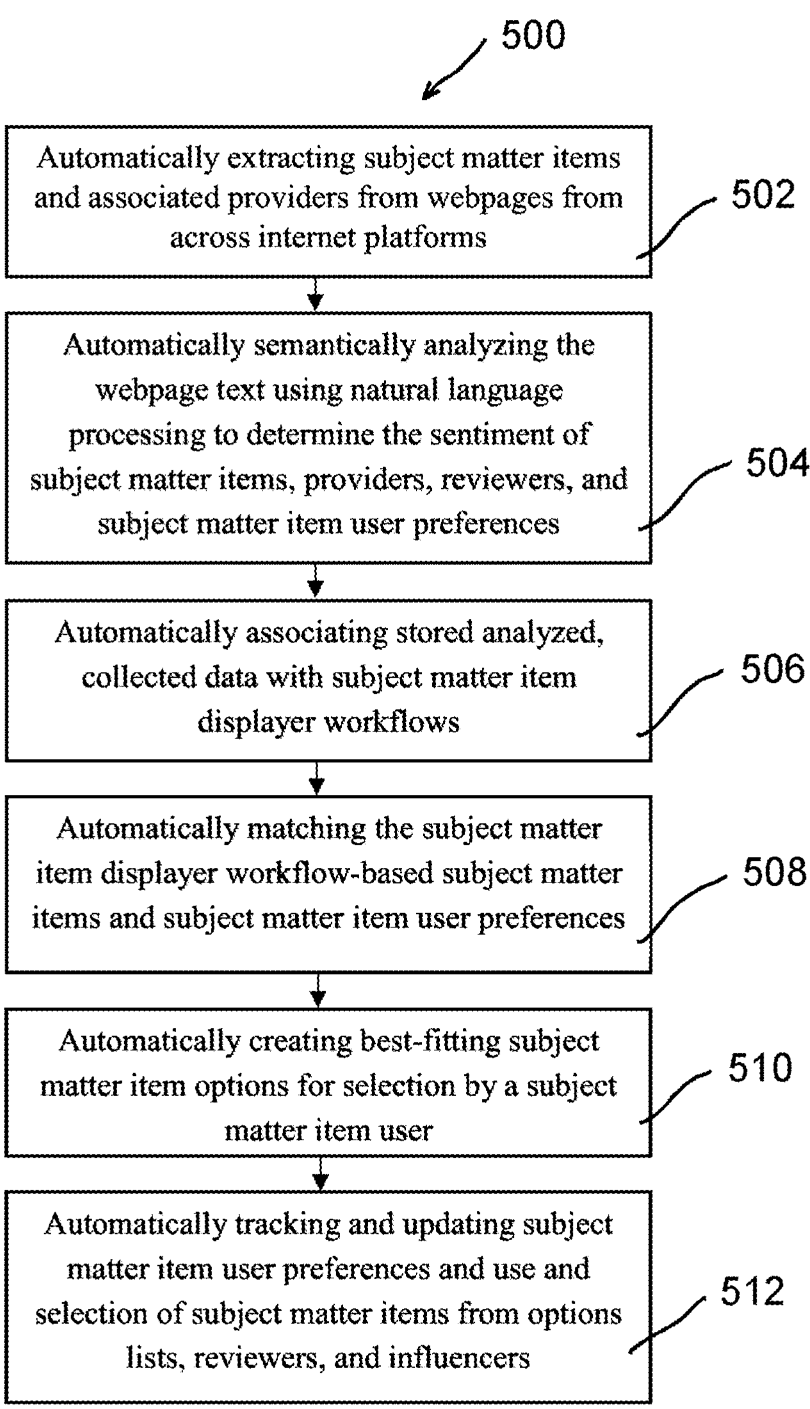
FIG. 24 shows a flow diagram of a system and method of creating a subject matter item assistance system, in accordance with embodiments of the present invention.

FIG. 24 provides a flow diagram of a general process, system, and method 500 of creating a SMIAS, comprising: automatically extracting subject matter items and associated providers from webpages from across internet platforms at block 502. The webpage text is automatically semantically analyzed using natural language processing to determine the sentiment of subject matter items, providers, reviewers, and subject matter item user preferences at block 504. Stored analyzed collected data is automatically associated with subject matter item displayer workflows, at block 506, and the subject matter item displayer workflow-based subject matter items and subject matter item user preferences are automatically matched at block 508. At block 510, the system and method 500 automatically creates best-fitting subject matter item options (recommendations) to be presented by the subject matter item displayer for selection by a subject matter item user. Then, subject matter item user preferences and use and selection of subject matter items from options lists, reviewers and influencers are automatically tracked and updated at block 512.

Figure 25:
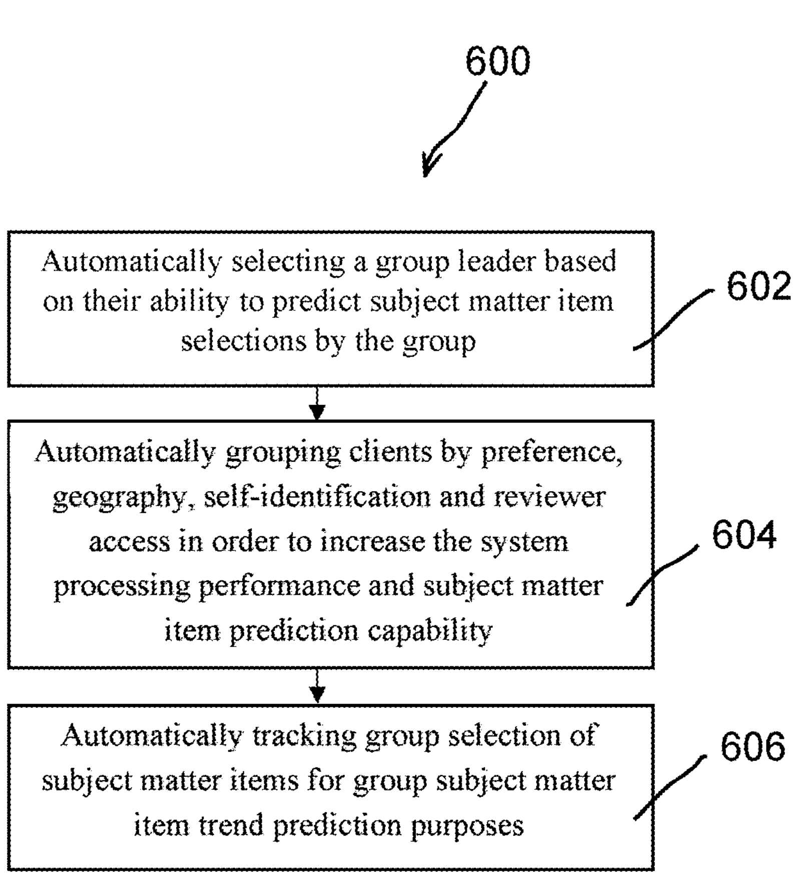
FIG. 25 shows a flow diagram of a system and method of predicting option item selection by creating groups of clients, in accordance with embodiments of the present invention.

FIG. 25 provides a flow diagram of a general process, system, and method 600 of predicting option item selection by creating groups of clients. A group leader is automatically selected based on their ability to predict subject matter item selections by the group at block 602. The system and method 600 automatically groups clients by preference, geography, self-identification, and reviewer access in order to increase the system processing performance and subject matter item prediction capability, at block 604. Group selection of subject matter items for group subject matter item trend prediction purpose are automatically tracked at block 606.

The following examples of use cases as they apply to the online consultancy industry represent how various system actors interact with the system and methods depicted herein:
Use Case UC0001:

| Header | | |
|---|---|---|
| Use Case ID | UC0001 | |
| Use Case Version | 1.000 | |
| **Body** | | |
| Title | Automated Subject Matter Item Provider Access to Consultants | |
| Actors | Subject matter item providers, system operators, consultants, clients | |
| Normal Flow | Step 1 | Subject matter item providers sign up by giving the system operator information about their subject matter items and webpages. |
| | Step 2 | System operator gives the Consultancy Assistance System (CAS) the subject matter item provider's related URLs to find, extract and analyze the subject matter item provider's webpages and related webpages. |
| | Step 3 | Consultants transmit workflow steps based on expertise in a subject matter to the CAS. |
| | Step 4 | Consultants transmit subject matter item preferences of the clients to the CAS. |
| | Step 5 | System operator uses the CAS to find any matches between the subject matter item information associated with a subject matter item provider and client preferences gathered by the consultant. |
| | Step 6 | If there are one or more matches, the provider is accepted by the system operator. |
| | Step 7 | Information on the use of subject matter item provider's subject matter items on an option list and any selection by clients of subject matter items is given to the relevant subject matter item provider. |
| | Step 8 | The CAS periodically finds and analyzes relevant provider's information to automatically update that information. |
| | Step 9 | New subject matter item providers can be found by the CAS as various subject matter items are extracted and analyzed across platforms and those new providers invited to submit information to the system operator. |

Use case 0001 can be converted to a specific application as shown in use case UC0001a.

| Header | | |
|---|---|---|
| Use Case ID | UC0001a | |
| Use Case Version | 1.000 | |
| **Body** | | |
| Title | Automated Asset Manager (Provider) Access to Financial Advisors (Consultants) | |
| Actors | Asset managers (subject matter item providers), finance facilitator (system operator), financial advisors (consultants), investor (client) | |
| Example | Step 1 | Asset managers (subject matter item providers) sign up by giving the finance facilitator (system operator) information about their assets (subject matter items) and webpages. |
| | Step 2 | Finance facilitator (system operator) gives the CAS the asset manager's (subject matter item provider's) related URLs to analyze the asset manager's (subject matter item provider's) webpages and related webpages. |
| | Step 3 | Financial advisors (consultants) transmit workflow steps based on expertise in a financial (subject matter) area to the CAS. |
| | Step 4 | Financial advisors (consultants) transmit asset (subject matter item) preferences of the investors (clients) to the CAS. |
| | Step 5 | Finance facilitator (system operator) uses the CAS to find any matches between asset (subject matter item) information associated with an asset manager (subject matter item provider) and investor (client) preferences gathered by the financial advisor (consultant). |
| | Step 6 | If there are one or more matches, the asset manager (subject matter item provider) is accepted by the finance facilitator (system operator). |

-continued

| Header | | |
|---|---|---|
| Use Case ID | | UC0001a |
| Use Case Version | | 1.000 |
| | Step 7 | Information on the use of an asset manager's (subject matter item provider's) asset (subject matter item) on an option list and any selection by investors (clients) of that asset (subject matter item) is given to the relevant asset manager (subject matter item provider). |
| | Step 8 | The CAS periodically finds and analyzes relevant asset manager's (subject matter item provider's) information to automatically update that information. |
| | Step 9 | New asset managers (subject matter item providers) can be found by the CAS as various assets (subject matter items) are extracted and analyzed across platforms and those new asset managers (subject matter item providers) invited to submit information to finance facilitator (system operator). |

Use Case UC0002:

| Header | | |
|---|---|---|
| Use Case ID | | UC0002 |
| Use Case Version | | 1.000 |
| Body | | |
| Title | | Automatic Client Preference Determination |
| Actors | | Clients, consultant, system operator |
| Normal Flow | Step 1 | Consultants are given access to a client's profile information as well as to the relevant, tracked webpages accessed by the client. |
| | Step 2 | The consultant's application is able to cause a client's profile and webpage URLs to be analyzed by transferring this information to the CAS system. |
| | Step 3 | The CAS uses the client-given URL information to access the internet and obtain the relevant text from the given webpages. The text from both the webpages and the client profile is analyzed by the CAS using natural language processing to obtain preference information. |
| | Step 4 | The consultant has the ability to present subject matter item options to the client. The items that are selected are added to the client's preferences. |
| | Step 5 | This CAS-generated preference information merged with any prior existing preferences produces a new updated set of preferences. |
| | Step 6 | The updated client preferences are given to both the client's associated consultant and to the system operator. |

Use case 0002 can be converted to a specific application as shown in use case UC0002a.

| Header | | |
|---|---|---|
| Use Case ID | | UC0002a |
| Use Case Version | | 1.000 |
| Body | | |
| Title | | Automatic Investor (Client) Preference Determination |
| Actors | | Investors (clients), financial advisors (consultants), finance facilitator (system operator) |
| Normal Flow | Step 1 | Financial advisors (consultants) are given access to an investor's (client's) profile information as well as to the relevant, tracked webpages accessed by the investor (client). |
| | Step 2 | The financial advisor's (consultant's) application is able to cause the investor's (client's) profile and webpage URLs to be analyzed by transferring this information to the CAS system. |
| | Step 3 | The CAS uses the investor(client)-given URL information to access the internet and obtains the relevant text from the given webpages. The text from both the webpages and the investor (client) profile is analyzed by the CAS using natural language processing to obtain preference information. |

-continued

| Header | | |
|---|---|---|
| Use Case ID | | UC0002a |
| Use Case Version | | 1.000 |
| | Step 4 | The financial advisor (consultant) has the ability to present asset (subject matter item) options to the investor (client). The assets (subject matter items) that are selected are added to the investor's (client's) preferences. |
| | Step 5 | This CAS-generated preference information merged with any prior existing preferences produces a new updated set of preferences. |
| | Step 6 | The updated investor (client) preferences are given to both the investor's (client's) associated financial advisor (consultant) as well as to the finance facilitator (system operator). |

Use Case UC0003:

| Header | | |
|---|---|---|
| Use Case ID | | UC0003 |
| Use Case Version | | 1.000 |
| **Body** | | |
| Title | | Automatic Consultant Workflow Step Option Determination |
| Actors | | Consultants, clients |
| Normal Flow | Step 1 | Consultants typically follow workflows to ensure that the service provided is uniform. Workflows contain multiple work steps, each of which can contain plain text, subject matter item options, plans, or advisory notices. Subject matter items can be selected at each step/plan/advisory notice. |
| | Step 2 | Using the client's preferences, the CAS can ensure that only preferred options are presented to the client at each specific workflow step/plan/advisory notice. |
| | Step 3 | The subject matter item selected by the client at each step/plan/advisory notice can be tracked and used by the CAS to update a client's subject matter item preferences. |
| | Step 4 | The CAS can combine the client selection with reviewer sentiment to determine the effects of reviews on client subject matter item selection. |
| | Step 5 | The CAS can track all workflow-related subject matter item option selections for all clients of a consultant, allowing the clients to be grouped. |
| | Step 6 | Changing the subject matter items within each workflow step automatically causes the client preferences of unused workflow steps to be reevaluated for the current client. |

Use case 0003 can be converted to a specific application as shown in use case UC0003a.

| Header | | |
|---|---|---|
| Use Case ID | | UC0003a |
| Use Case Version | | 1.000 |
| **Body** | | |
| Title | | Automatic Financial Advisor (Consultant) Workflow Step Option Determination |
| Actors | | Financial advisors (consultants), investors (clients) |
| Normal Flow | Step 1 | Financial advisors (consultants) typically follow workflows to ensure that the service provided is uniform. Workflows contain multiple work steps, each of which can contain plain text, asset (subject matter item) options, plans, or advisory notices. Assets (subject matter items) can be selected at each step/plan/advisory notice. |
| | Step 2 | Using the client's preferences, the CAS can ensure that only preferred options are presented to the investor (client) at the specific workflow step/plan/advisory notice. |

-continued

| Header | | |
|---|---|---|
| Use Case ID | | UC0003a |
| Use Case Version | | 1.000 |
| | Step 3 | The asset (subject matter item) selected by the investor (client) at each step/plan/advisory notice can be tracked and used by CAS to update an investor's (client's) asset (subject matter item) preferences. |
| | Step 4 | The CAS can combine the investor (client) selection with reviewer sentiment to determine the effects of reviews on an investor's (client's) asset (subject matter item) selection. |
| | Step 5 | The CAS can track all workflow-related asset (subject matter item) option selections for all investors (clients) of all financial advisors (consultants), allowing the investors (clients) to be grouped. |
| | Step 6 | Changing the assets (subject matter items) within a workflow step automatically causes the investor (client) preferences of unused workflow steps to be reevaluated for the current investor (client). |

Use Case UC0004:

| Header | | |
|---|---|---|
| Use Case ID | | UC0004 |
| Use Case Version | | 1.000 |
| Body | | |
| Title | | Automatic Client Literacy Determination |
| Actors | | System operator, clients, consultants |
| Normal Flow | Step 1 | The system operator's application sends an initial set of URLs to the CAS where both the given webpages and any associated unique webpage links are counted, giving a total subject matter area page count. |
| | Step 2 | As the client accesses various webpages associated with the subject matter area, the associated URLs and the dwell time associated with those URLs are tracked and sent to the consultant's application. |
| | Step 3 | The consultant's application sends its client's tracked and timed URLs to the CAS where the unique webpage URLs that have been accessed for the minimum time period are added to that client's webpage access list. |
| | Step 4 | The CAS counts the total number of unique webpage URLs and saves this count as the client's subject matter area page access. |
| | Step 5 | The CAS periodically computes the ratio of the client's subject matter area page access to the total subject matter area page count, giving the client literacy. |
| | Step 6 | The CAS sends the client literacy to the consultant's application. |
| | Step 7 | The client's literacy is compared to the consultant's baseline literacy so that the consultant can recommend additional webpages to increase the client's literacy. |

Use case 0004 can be converted to a specific application as shown in use case UC0004a.

| Header | |
|---|---|
| Use Case ID | UC0004a |
| Use Case Version | 1.000 |
| Body | |
| Title | Automatic Investor (Client) Literacy Determination |
| Actors | Finance facilitator (system operator), investors (clients), financial advisors (consultants) |

-continued

| Header | | |
|---|---|---|
| Use Case ID | | UC0004a |
| Use Case Version | | 1.000 |
| Normal Flow | Step 1 | The finance facilitator's (system operator's) application sends an initial set of URLs to the CAS where both the given webpages and any associated unique webpage links are counted, giving a total financial (subject matter) area page count. |
| | Step 2 | As the investor (client) accesses various webpages associated with the financial (subject matter) area, the associated URLs and the dwell time associated with those URLs are tracked and sent to the financial advisor's (consultant's) application. |
| | Step 3 | The financial advisor's (consultant's) application sends its investor's (client's) tracked and timed URLs to the CAS where the unique webpage URLs that have been accessed for the minimum time period are added to that investor's (client's) webpage access list. |
| | Step 4 | The CAS counts the total number of unique webpage URLs and saves this count as the investor's (client's) financial (subject matter) area page access. |
| | Step 5 | The CAS periodically computes the ratio of the investor's (client's) financial (subject matter) area page access to the total financial (subject matter) area page count, giving the investor (client) literacy. |
| | Step 6 | The CAS sends the client literacy to the financial advisor's (consultant's) application. |
| | Step 7 | The investor's (client's) literacy is compared to the financial advisor's (consultant's) baseline literacy so that the financial advisor (consultant) can recommend additional webpages to increase the investor's (client's) literacy. |

Use Case UC0005:

| Header | | |
|---|---|---|
| Use Case ID | | UC0005 |
| Use Case Version | | 1.000 |
| Body | | |
| Title | | Automatic Consultant Preference Group Add, Delete, and Update and Leader Selection |
| Actors | | System operator, clients, consultants |
| Normal Flow | Step 1 | The client's application sends the client's preferences to the consultant's application as an automatic feature of the client application. |
| | Step 2 | The consultant's application receives and stores the client's preferences. |
| | Step 3 | The consultant's application periodically compares the stored client preferences to the preferences that define the consultant's associated preference groups. |
| | Step 4 | If a client's preferences partially match those of a consultant's existing preference group, the consultant's application will generate a new inclusive overlapping preference group. |
| | Step 5 | If there are no preference matches then the consultant's application creates a new preference group containing the client's full set of preferences and places that client into that new group. |
| | Step 6 | If there is a full match between of a consultant's preference group and the preferences of a client then that client is placed in that group. |
| | Step 7 | The consultant's application periodically compares the preferences and selections of all clients within a group to identify any required group membership changes. |
| | Step 8 | The probability of a client correctly selecting the same subject matter item as another client within the same preference group is calculated. |
| | Step 9 | The selection date/time for each option list is determined for each client. |

-continued

| Header | | |
|---|---|---|
| Use Case ID | UC0005 | |
| Use Case Version | 1.000 | |
| | Step 10 | The client who consistently selects a subject matter item option the soonest and who has the highest probability of selecting the same subject matter item as the other clients for the same option list within a preference group is designated the preference group leader. |

Use case 0005 can be converted to a specific application as shown in use case UC0005a.

| Header | | |
|---|---|---|
| Use Case ID | UC0005a | |
| Use Case Version | 1.000 | |
| Body | | |
| Title | Automatic Financial Advisor (Consultant) Preference Group Add, Delete and Update and Leader Selection | |
| Actors | Finance facilitator (system operator), investors (clients), and financial advisors (consultants) | |
| Normal Flow | Step 1 | The investor's (client's) application sends the investor (client) preferences to the financial advisor's (consultant's) application as an automatic feature of the investor (client) application. |
| | Step 2 | The financial advisor's (consultant's) application receives and stores the investor's (client's) preferences. |
| | Step 3 | The financial advisor's (consultant's) application periodically compares the stored investor (client) preferences to the preferences that define the financial advisor's (consultant's) associated preference groups. |
| | Step 4 | If an investor's (client's) preferences partially match those of a financial advisor's (consultant's) existing preference group, the financial advisor's (consultant's) application will generate a new inclusive overlapping preference group. |
| | Step 5 | If there are no preference matches then the financial advisor's (consultant's) application creates a new preference group containing the investor's (client's) full set of preferences and places that client into that new group. |
| | Step 6 | If there is a full match between of a financial advisor's (consultant's) preference group and the preferences of an investor (client) then that investor (client) is placed in that group. |
| | Step 7 | The financial advisor's (consultant's) application periodically compares the preferences and selections of all investors (clients) within a group to identify any required group membership changes. |
| | Step 8 | The probability of an investor (client) correctly selecting the same subject matter item as another investor (client) within the same preference group is calculated. |
| | Step 9 | The selection date/time for each option list is determined for each investor (client). |
| | Step 10 | The investor (client) who consistently selects an asset (subject matter item) option the soonest and who has the highest probability of selecting the same asset (subject matter item) as the other investors (clients) for the same option list within a preference group is designated the preference group leader. |

Various devices or computing systems can be included and adapted to process and carry out the aspects, computations, and algorithmic processing of the software systems and methods of the present invention. Computing systems, devices, or appliances of the present invention may include a computer system, which may include one or more microprocessors, one or more processing cores, and/or one or more circuits, such as an application-specific integrated circuit (ASIC), field-programmable gate arrays (FPGAs), graphics processing units (GPU), general purpose graphics processing units (GPGPU), etc. Any such device or computing system is defined as a processing element herein. A server processing system for use by or connected with the systems of the present invention may include a processor, which may include one or more processing elements. Further, the devices can include a network interface or a bus system in cases where the processing elements are within the same chip. The network interface is configured to enable communication with the internet, communication networks, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the devices include a microprocessor, computer-readable program code may be stored in a computer-readable medium or memory, such as but not limited to magnetic media (e.g., a hard disk), optical media (e.g., an OVO), memory devices (e.g., random access memory, flash memory), etc. The computer program or software code can be stored on a tangible, or non-transitive, machine-readable medium or memory. In some embodiments, computer-readable program code is configured such that when executed by a processing element, the code causes the device to perform the steps described above and herein. In other embodiments, the device is configured to perform steps described herein without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The devices, appliances, or computing devices may include an input device. The input device is configured to receive an input from either a user (e.g., admin, user, etc.) or a hardware or software component as disclosed herein in connection with the various user interface or automatic data inputs. Examples of an input device include data ports, keyboards, a mouse, a microphone, scanners, sensors, touch screens, game controllers, and software enabling interaction with a touch screen, etc. The devices can also include an output device. Examples of output devices include monitors, televisions, mobile device screens, tablet screens, speakers, remote screens, screen less 3D displays, data ports, HUDs, etc. An output device can be configured to display images, media files, text, or video, or play audio to a user through speaker output.

The term communication network includes one or more networks such as a data network, wireless network, a telephony network, or any combination thereof. It is contemplated that the data network may be any local area network (LAN), metropolitan area network (MAN), wide area network (WAN), the internet, cloud computing platform, or any other suitable packet-switched network, such as a commercially owned, proprietary packet-switched network, e.g., a proprietary cable or fiber-optic network. In addition, the wireless network may be, for example, a cellular network and may employ various technologies including global system for mobile communications (GSM), internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WIFI), satellite, mobile ad-hoc network (MANET), and the like.

While various embodiments have been described above, it should be understood that they have been presented by way of example only, and not limitation. Thus, the breadth and scope of the present disclosure should not be limited by any on the above-described embodiments or examples. Moreover, any combination of the above-described elements in all possible variations thereof is encompassed by the disclosure unless otherwise indicated herein or otherwise clearly contradicted by context.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

While the present invention has been described in connection with various aspects and examples, it will be understood that the present invention is capable of further modifications. This application is intended to cover any variations, uses or adaptation of the invention following, in general, the principles of the invention, and including such departures from the present disclosure as come within the known and customary practice within the art to which the invention pertains.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A method for optimizing financial decision making, the method comprising:

receiving, financial context data associated with a financial decision;

receiving unstructured data from a plurality of data sources;

processing the unstructured data to generate a set of event features and sentiment features using a trained model, the trained model performing natural language processing to derive semantic embeddings for the sentiment features;

determining, based at least in part on the financial context data, the event features, and the sentiment features, predictions for the financial decision;

generating a list of workflow options based at least in part on the predictions for the financial decision;

selecting a workflow option from the list of workflow options; and returning information about the selected workflow option for processing related to the financial decision.

2. The method of claim 1, wherein the financial context data comprises at least one of investments data, funds data, investment types data, or qualifying investments.

3. The method of claim 1, further comprising:

rating each workflow option in the list of workflow options; and selecting the workflow option from the list of workflow options based on the respective rating.

4. The method of claim 3, further comprising:

selecting a portion of the list of workflow options based on respective ratings; and presenting the portion of the list of workflow options to a client.

5. The method of claim 4, further comprising:

receiving client selection of the workflow option; and performing an action based on the client-selected workflow option.

6. The method of claim 1, wherein returning the information comprises performing actions according to the selected workflow option.

7. The method of claim 1, wherein the financial decision comprises identifying an investment opportunity.

8. The method of claim 1, wherein the unstructured data comprises at least social media content and newsfeed data.

9. The method of claim 1, further comprising automatically executing a workflow corresponding to the selected workflow option.

10. The method of claim 9, wherein the workflow defines a sequence of operations to be performed that relate to the financial decision.

11. The method of claim 1, wherein processing the unstructured data to generate the set of event features and sentiment features using the trained model comprises:

extracting text strings from the unstructured data;

converting the text strings into a list of tokens; and identifying phrases and words from the list of tokens that are associated with a particular subject to generate the set of event features and sentiment features.

12. The method of claim 11, wherein the trained model comprises a bidirectional encoder representations from transformer (BERT) model.

13. A non-transitory computer-readable medium storing instructions that, when executed by one or more processors of a computing system, cause the computing system to perform operations comprising:

receiving, financial context data associated with a financial decision;

receiving unstructured data from a plurality of data sources;

processing the unstructured data to generate a set of event features and sentiment features using a trained model, the trained model performing natural language processing to derive semantic embeddings for the sentiment features;

determining, based at least in part on the financial context data, the event features, and the sentiment features, predictions for the financial decision;

generating a list of workflow options based at least in part on the predictions for the financial decision;

selecting a workflow option from the list of workflow options; and returning information about the selected workflow option for processing related to the financial decision.

14. The non-transitory computer-readable medium of claim 13, wherein the financial context data comprises at least one of investments data, funds data, investment types data, or qualifying investments.

15. The non-transitory computer-readable medium of claim 13, further comprising:

rating each workflow option in the list of workflow options; and selecting the workflow option from the list of workflow options based on the respective rating.

16. The non-transitory computer-readable medium of claim 15, further comprising:

selecting a portion of the list of workflow options based on respective ratings; and presenting the portion of the list of workflow options to a client.

17. The non-transitory computer-readable medium of claim 16, further comprising:

receiving client selection of the workflow option; and performing an action based on the client-selected workflow option.

18. The non-transitory computer-readable medium of claim 13, wherein returning the information comprises performing actions according to the selected workflow option.

19. The non-transitory computer-readable medium of claim 13, further comprising automatically executing a workflow corresponding to the selected workflow option.

20. The non-transitory computer-readable medium of claim 19, wherein the workflow defines a sequence of operations to be performed that relate to the financial decision.

* * * * *